US011461109B1

(12) United States Patent
Krasilnikov et al.

(10) Patent No.: US 11,461,109 B1
(45) Date of Patent: Oct. 4, 2022

(54) QUICK RESTART USING VIRTUALIZED RESOURCE MIGRATION

(71) Applicant: Amazon Technologies, Inc., Seattle, WA (US)

(72) Inventors: Nikolay Krasilnikov, Seattle, WA (US); Rudresh Amin, Seattle, WA (US); Alexey Gadalin, Kirkland, WA (US); Anton Valter, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 338 days.

(21) Appl. No.: 16/689,384

(22) Filed: Nov. 20, 2019

(51) Int. Cl.
*G06F 9/44* (2018.01)
*G06F 9/455* (2018.01)
*G06F 9/48* (2006.01)
*G06F 9/4401* (2018.01)

(52) U.S. Cl.
CPC ........ *G06F 9/4416* (2013.01); *G06F 9/45558* (2013.01); *G06F 9/4856* (2013.01)

(58) Field of Classification Search
CPC ... G06F 9/4416; G06F 9/45558; G06F 9/4856
See application file for complete search history.

(56) References Cited

U.S. PATENT DOCUMENTS

| 9,348,646 B1* | 5/2016 | Daya | G06F 9/4856 |
| 2015/0040127 A1* | 2/2015 | Dippenaar | G06F 9/5044 718/1 |
| 2021/0124602 A1* | 4/2021 | Tsirkin | G06F 12/0646 |

\* cited by examiner

*Primary Examiner* — Stefan Stoynov
(74) *Attorney, Agent, or Firm* — Lee & Hayes, P.C.

(57) ABSTRACT

This disclosure describes systems, devices, and techniques for quick restarts of virtualized resources hosted by a cloud-based network. In an example method, a request to restart a virtualized resource hosted by a first server can be received. A second server, with a capacity to host the virtualized resource, may be identified. In response to identifying the second server, the virtualized resource can be migrated from the first server to the second server. A message confirming that the virtualized resource has been restarted may be transmitted.

20 Claims, 10 Drawing Sheets

QUICK RESTART USING VIRTUALIZED RESOURCE MIGRATION

BACKGROUND

In various cloud-based networks, multiple software-based virtualized resources (also referred to as "instances") can be hosted on the same physical server. According to some examples, a single virtualized resource may be distributed across multiple physical servers. A remote user can manage operations performed by the virtualized resource remotely from the physical server(s) hosting the virtualized resource, without specifically having control over the physical server(s). Because the user does not need to control the physical server(s), cloud-based networks may allow users to flexibly scale their usage of various computing resources.

Like various other types of software, in some examples, a virtualized resource's functionality may be degraded during operation. For instance, although multiple virtualized resources hosted by the same physical server may be isolated from each other by containers and other cloud-based technologies, in some cases, one virtualized resource hosted by the server may detrimentally affect the functionality of another virtualized resource hosted by the server. In some cases, a virtualized resource itself, or another type of software running on a server, may require reconfiguration or updates.

Restarting a virtualized resource may improve its performance during operation. However, restarting a virtualized resource in a cloud-based network can introduce some technical problems.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
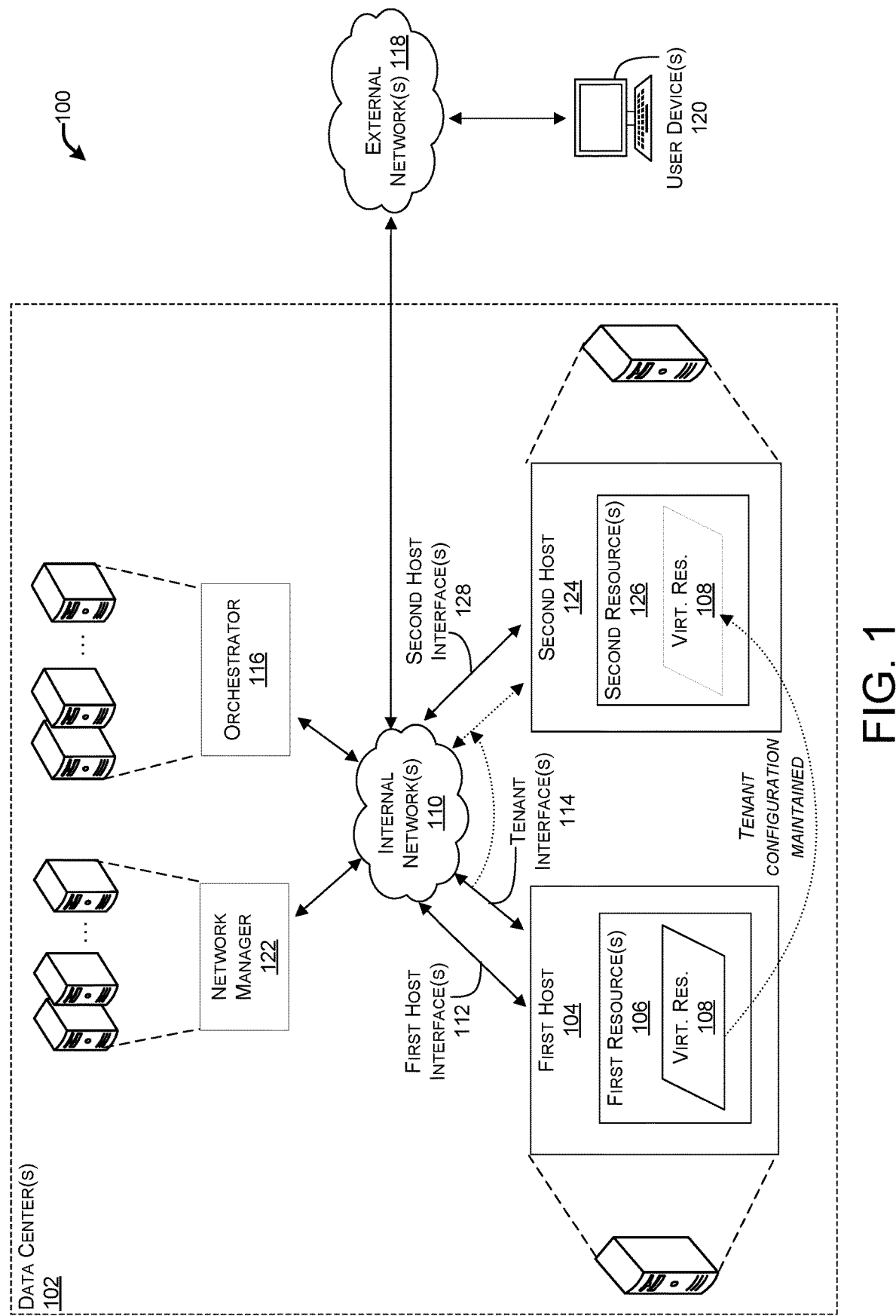
FIG. 1 illustrates an example environment for implementing a quick restart using migration. During a quick restart of a virtualized resource, the virtualized resource can be migrated from a first host to a second host.

This disclosure describes systems, devices, and techniques for restarting virtualized resources hosted in a network-based environment using migration. By migrating virtualized resources during restarts, various implementations described herein can reduce restart latency, reduce the occurrence of errors during restarts, and reduce network resource utilization.

A virtualized resource may be restarted for a variety of reasons. For instance, in some cases, the virtualized resource may be occupying resources of a host with one or more noisy-neighbors. A noisy-neighbor may be an instance that monopolizes resources of the host, thereby interfering with the performance of the virtualized resource. In various implementations, a user of the virtualized resource may monitor the performance of the virtualized resource and/or set certain thresholds to monitor the performance of the virtualized resource. When the performance of the virtualized resource is lagging, the virtualized resource may be restarted in response to a request by the user or automatically by an element of the network in which the virtualized resource resides.

During a conventional restart, functionality of the virtualized resource (e.g., operations associated with the virtualized resource that are performed on one or more processors) may be ceased prior to reserving a portion of host resources that can be used to relaunch the virtualized resource. Any data associated with the virtualized resource may be removed from the host resources in which the data occupies. After the functionality of the virtualized resource has ceased, the virtualized resource may be rebuilt within host resources, which may be the same or different from the host resources that originally hosted the virtualized resource. Finally, the virtualized resource may be launched after it is rebuilt within the host resources.

A conventional restart can have a number of technical problems. First, the conventional restart can be associated with a latency, during which the virtualized resource is nonfunctional, meaning that data and/or processes associated with the virtualized resource are inaccessible. In some cases, the latency associated with the conventional restart can last from one to ten minutes. Thus, the functionality of the virtualized resource can be substantially interrupted by a conventional restart.

Second, a configuration of the virtualized resource may be lost during the conventional restart. The configuration may include various metadata and/or settings associated with the virtualized resource that may be reallocated to other entities within the network during the conventional restart. For example, the virtualized resource may lose its original Internet Protocol (IP) address while operations of the virtualized resource cease during the restart. In cases where the virtualized resource is hosted in a network-based environment, in which the virtualized resource is tracked using a unique virtualized resource Identifier (ID) other than an IP address, the virtualized resource ID may also be lost during the restart. Various communication interfaces associated with the virtualized resource may also be torn down or otherwise decommissioned during the restart. Although elements (e.g., the IP address, the virtualized resource ID, the communication interfaces, etc.) of the configuration may be rebuilt before the virtualized resource is relaunched at the conclusion of the restart, the restart may effectively change the configuration of the virtualized resource, which may be undesirable to the user and which may be undesirable for expected functions and processes associated with the virtualized resource.

Third, the conventional restart may be a resource-intensive process from the perspective of the network hosting the virtualized resource. The process of redefining the configuration of the virtualized resource may occupy an inordinate amount of network resources. For example, assigning the virtualized resource with a new IP address, a new virtualized resource ID, and/or building new communication interfaces for the virtualized resource may occupy an unnecessary amount of the computing and/or memory resources of the network. Accordingly, the conventional restart can be detrimental to the network itself.

Fourth, the conventional restart may result in an error when, during the restart, the host loses sufficient available capacity to launch the virtualized resource. For example, after the virtualized resource ceases functionality and is removed from a portion of the host resources, the portion of the host resources may be reassigned to another virtualized resource, and a total amount of the host resources may no longer be sufficient to accommodate the virtualized resource. An "insufficient capacity" error can occur during these circumstances. This error may prevent the virtualized resource from reengaging in operations after the restart that may have been occurring prior to the restart. Thus, the conventional restart can result in disastrous interruptions to ongoing virtualized resource operations.

Various implementations of the present disclosure introduce an alternative to the conventional restart. This alternative may be referred to, herein, as a "quick restart." During a quick restart, a virtualized resource is migrated from one or more first resources of a first host to one or more second resources of a second host. Certain checks may be performed in advance to determine whether the time required for migration of the virtualized resource may be less time than the latency of the conventional restart. For example, an instance with local memory that needs to be transferred may be analyzed to determine whether the amount of data in the local memory is less than a threshold, where the threshold is set based on the amount of time required for a conventional restart versus the amount of time required to transfer the data of a network to a new host. If the criteria are met, instead of implementing a local restart workflow, the host of the virtualized resource can implement a migration workflow. In addition, the configuration of the virtualized resource can be maintained during migration, which may reduce the burden on network resources and improve user convenience. Furthermore, during a migration process, a sufficient capacity to host the virtualized resource can be identified and reserved in advance, thereby preventing the virtualized resource from ceasing functionality unless there is sufficient capacity to relaunch the virtualized resource after it is restarted.

Migrating the virtualized resource during the quick restart can also improve the performance of the virtualized resource in other ways. In some cases, the previous host, itself, may detrimentally impact the performance of the virtualized resource. For example, the previous host may be running an Operating System (OS) that has not been updated in a significant amount of time, which could introduce security risks to the virtualized resource. In some cases, the previous host may include relatively old hardware that slows down the performance of the virtualized resource. By migrating the virtualized resource to a new host, the detrimental impacts of the previous host on the virtualized resource can be resolved.

For various reasons described herein, implementations of the present disclosure provide a number of practical, technical improvements to the field of cloud-based networks. Particular examples disclosed herein can improve virtualized resource restarts in a cloud-based network by reducing latency associated with virtualized resource restarts, thereby decreasing the amount of time the virtualized resource and/or data associated with the virtualized resource is unavailable. Various implementations can be used to maintain a configuration of a virtualized resource during a restart, which may be more convenient for users than restarts in which the configuration is modified. In addition, by maintaining the configuration of the virtualized resource, implementations of the quick restart can be less burdensome to a cloud-based network than a conventional restart. Further, various implementations of the present disclosure can be used to prevent the occurrence of insufficient capacity errors during virtualized resource restarts.

FIG. 1 illustrates an example environment 100 for implementing a quick restart using migration. As illustrated, the environment 100 can include one or more data centers 102. In some cases, the data center(s) 102 include multiple data centers with different power backup, such that the multiple data centers are unlikely to lose power simultaneously. In particular, the data center(s) 102 illustrated in the environment 100 may be located in a single availability zone and/or geographic region.

The data center(s) 102 can include a first host 104. As used herein, the term "host" can refer to one or more physical servers configured to host one or more software virtualized resources. In some cases, a host can be a "shared server," which may be a single physical server configured to run multiple software virtualized resources, simultaneously. In some cases, a host can be a "bare-metal server," which may be a single physical server configured to run a single software virtualized resource at a particular time.

The first host 104 may include one or more first resources 108. As used herein, the terms "resources," "computing resources," and their equivalents can refer to at least one of processing resources, memory resources, cache resources, service resources, or the like, of one or more devices. The term "processing resource," and its equivalents, may refer to the availability of at least a portion of one or more physical processors (e.g., Central Processing Units (CPUs)) to process data. The term "memory resource," and its equivalents, may refer to the availability of at least a portion of one or more physical memory systems (e.g., Random Access Memory (RAM)) to store data. The term "cache resource," and its equivalents, can refer to the availability of a capacity in a RAM and/or in-memory engine to cache data at least temporarily. The term "service resource," and its equivalents, may refer to the availability of one or more services hosted by a physical server to perform requested operations. In various implementations described herein, the term "capacity" can refer to an amount of one or more resources. For instance, a capacity of a processing resource can be in units of Gigahertz (GHz), a capacity of a memory resource can be in units of Gigabytes (GB), or the like. In some multitenancy examples, a first capacity of a resource (e.g., a memory resource) may be allocated to a first virtualized resource and a second capacity of the resource may be allocated to a second virtualized resource, wherein a total capacity of the resource may be at least as large as a combination (e.g., a sum) of the first capacity and the second capacity. An "available capacity" may refer to a portion of at least one resource that is not allocated to a virtualized resource and/or is free to be allocated to a virtualized resource.

As illustrated in FIG. 1, the first host 104 is hosting a virtualized resource 108 using the first resource(s) 106. The virtualized resource 108 may occupy at least a portion of the first resource(s) 106. The portion of the first resource(s) 106 may be referred to as a "slot" or "domain" of the first host 104. A size of the slot may be defined as its capacity. As used herein, the term "virtualized resource" can refer to software and/or data that can be hosted by a host device, such as a server. In various examples, a single virtualized resource may be associated with a single user or entity (e.g., a corporation, a business, a government agency, a non-profit, etc.), a single user or entity account, or group of users or entities. For the purposes of this discussion, the terms "user" and "entity" can be used interchangeably. Although not illustrated in the environment 100 of FIG. 1, in some cases, a virtualized resource can be hosted by multiple physical servers, simultaneously.

The first host 104 may be connected to one or more internal networks 110 within the data center(s) 102. The internal network(s) 110 can include any number of nodes and/or interfaces configured to transmit data between various devices in the data center(s) 102. The internal network(s) 110 may include at least one Local Area Network (LAN). For instance, each data center within the data center(s) 102 may include a respective LAN that interconnects devices within the data center. In particular implementations, the internal network(s) 110 include at least one optical-fiber network that is capable of high-speed data transfer between devices within the data center(s) 102. The internal network(s) 110 may be associated with a limited amount of communication resources. As used herein, the term "communication resource," and its equivalents, can refer to a resource by which data can be routed and/or transferred through at least one network. Some examples of communication resources include entries in routing tables of routers, transmission intervals, bandwidth, communication channels, ports, or the like.

In various implementations, the first host 104 may be connected to the internal network(s) 110 via one or more first host interfaces 112. As used herein, the terms "interface," "communication interface," "network interface," or their equivalents, can refer to one or more wired and/or wireless connections over which a first node can transmit data and a second node can receive the data. In some cases, an interface can include one or more routers in a network that can relay data between the first node and the second node. In various implementations, an interface can be defined according to one or more allocated communication resources. For instance, an interface can be further defined according to bandwidth and/or at least one bearer (e.g., a Guaranteed Bit Rate (GBR) bearer) within a network that is reserved for communications associated with a particular endpoint. An interface may be defined in hardware, software, or a combination thereof. In various implementations, the internal network(s) 110 can include multiple routers interconnected by high-speed fiber-optic connections. Various elements of the data center(s) 102 may be interconnected by interfaces that traverse one or more of the routers and fiber-optic connections within the internal network(s) 110. Each router may maintain a routing table with one or more entries corresponding to one or more of the interfaces. Each entry may specify at least one of a port number, an address of the first node (e.g., an IP address of the first node), an address of the second node (e.g., an IP address of the second node), or any other information that the router utilizes to determine how to route data between the first and second nodes. Each entry may correspond to a particular interface.

The first host 104 may transmit data to and/or receive data from the internal network(s) via the first host interface(s) 112. In addition, the virtualized resource 108 may be associated with one or more virtualized resource interfaces 114. The virtualized resource 108 may transmit and receive data from the internal network(s) 110 via the virtualized resource interface(s) 114. When the virtualized resource 108 is hosted by the first host 104, the virtualized resource interface(s) 114 may be anchored to the first host 104. Accordingly, data addressed and transmitted to the virtualized resource 108 can be transmitted to the first host 104 over the virtualized resource interface(s) 114.

According to various implementations, the internal network(s) 110 may have a limited amount of communication resources. To preserve the limited amount of communication resources, unused interfaces may be decommissioned and/or torn down from the internal network(s) 110. In various implementations, the first host interface(s) 112 and/or the virtualized resource interface(s) 114 may occupy the communication resources of the internal network(s) 110.

The data center(s) 102 may further include an orchestrator 116 that is connected to the internal network(s) 110. The orchestrator 116 may include a single device (e.g., a server), multiple devices, or at least one Virtual Machine (VM) instance hosted on at least one device that can transmit and receive data over the internal network(s) 110. In various implementations, the orchestrator 116 can communicate with various devices, including the first host 104, within the data center(s) 102. In various cases, the orchestrator 116 may facilitate quick restarts of virtualized resources in the data center(s) 102.

The internal network(s) 110 may be further connected to one or more external networks 118. The external network(s) 118 may be at least partially outside of, or remote from, the data center(s) 102. According to some implementations, the external network(s) 118 may include at least one Wide Area Network (WAN), such as the Internet. In some cases, the external network(s) 118 may include one or more wired networks and/or one or more wireless networks. In various examples, at least one firewall separates the internal network(s) 108 from the external network(s) 118. Accordingly, the firewall(s) can protect the data center(s) 102 from malicious data traffic or unauthorized access originating from outside of the data center(s).

One or more user devices 120 may be configured to communicate with systems, devices, and functionality within the data center(s) 102 via the external network(s) 118. The user device(s) 120 can include any form of User Equipment (UE). As used herein, the terms "UE," "user device," "communication device," and "client device," can be used interchangeably to describe any device (e.g., the user device(s) 120) that is capable of transmitting/receiving data over a communication interface. In some cases, the communication interface is a wired interface. In certain examples, the communication interface can correspond to a wireless interface, such that the device can transmit and/or receive data wirelessly using any suitable wireless communications/data technology, protocol, or standard, such as Global System for Mobile communications (GSM), Time Division Multiple Access (TDMA), Universal Mobile Telecommunications System (UMTS), Evolution-Data Optimized (EVDO), Long Term Evolution (LTE), Advanced LTE (LTE+), New Radio (NR), Generic Access Network (GAN), Unlicensed Mobile Access (UMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), Voice over IP (VoW), VoLTE, Institute of Electrical and Electronics Engineers' (IEEE) 802.1x protocols, WiMAX, Wi-Fi, Data Over Cable Service Interface Specification (DOCSIS), digital subscriber line (DSL), CBRS, and/or any future Internet Protocol (IP)-based network technology or evolution of an existing IP-based network technology. The external network(s) 118, for instance, may be used to transmit data to and from the data center(s) 102 via any of the communication technologies, protocols, or standards described herein.

In various examples, the user device(s) 120 may be associated with a single user account in a cloud-hosting service. In some cases, the cloud-hosting service can host one or more user interfaces (e.g., a specialized application or a generic Internet browser) that are provided on the user device(s) 120. Using the user interfaces, a user of the user account can control the virtualized resource 108 and/or trigger restart of the virtualized resource 108. The user account may control the virtualized resource 108 hosted in the first resource(s) 106, remotely. According to particular implementations, the user account may correspond to a subscription for a particular amount of guaranteed resources. Thus, the first resource(s) 106 may have a particular slot capacity (e.g., amount of processing capabilities, memory capacity, or the like) in the data center(s) 102 that is reserved for the virtualized resource associated with the subscription. In some cases, a user can log onto the user account via the user interface(s) on the user device(s) 120. After logging into the user account, the user may control the functioning of the virtualized resource 108 and/or the first resource(s) 106 of the first host 104 remotely via the user interface(s).

A network manager 122 included in the data center(s) 102. According to various implementations, the network manager 122 may track virtualized resources (including the virtualized resource 108) and hosts (including the first host 104 and a second host 124) within the data center(s) 102. For instance, the network manager 122 may exchange signaling with various hosts within the data center(s) 102 in order to identify available capacity within resources of the various hosts. In some cases, the network manager 122 can further reserve capacity for virtualized resources on target hosts before the virtualized resources are migrated to the target hosts. The network manager 122 can include and/or be hosted by one or more servers within the data center(s) 102. For instance, the network manager 122 and the orchestrator 116 may be collocated on at least one server.

According to various implementations, a restart of the virtualized resource 108 may be triggered. As used herein, the terms "restart," "reboot," and their equivalents, can refer to a process by which software and/or hardware, designed to perform operations (e.g., receiving data, transmitting data, processing data, storing data in memory, or the like), finalizes any pending operations, ceases to perform the operations, and then begins the operations again. In some cases, a user can monitor the performance of the virtualized resource 108 via the user interface(s) on the user device(s) 120 and may decide to restart the virtualized resource 108 based on the performance. For instance, the user may identify that the performance of the virtualized resource 108 is degraded. As used herein, the term "degraded performance," and its equivalents, can refer to at least one performance metric (e.g., CPU usage, processing speed, memory usage, cache capacity, throughput, or the like) associated with a virtualized resource that has decreased over time. In some case, a degraded performance can refer to at least one performance metric of a virtualized resource 108 that is less than an expected performance metric associated with operations of the virtualized resource 108 and/or a guaranteed performance metric associated with a subscription held by a user associated with the virtualized resource 108. In some cases, the degraded performance of the virtualized resource 108 may be due to monopolization of resources, such as processing resources, cache resources, memory resources, or the like, of the first host 104 by a noisy-neighbor of the virtualized resource 108 on the first host 104. Upon identifying the degraded performance of the virtualized resource 108, the user may input, via the user interface(s), a request to restart the instance. According to some examples, a user may decide to change (e.g., increase) the resources hosting the instance. For example, the user may input, via the user interface, a request to increase a capacity of at least one computing resource that the virtualized resource occupies. The request to restart the virtualized resource may be transmitted, over the internal network(s) 110, to the first host 104 in which the virtualized resource 108 is occupying the first resource(s) 106.

The orchestrator 116 may be configured to identify the restart of the virtualized resource 108. The first host 104 can trigger the restart of the virtualized resource 108 in response to receiving a message indicating that the restart has been requested. In some examples, the user device(s) 120 may transmit a request to initiate the restart to the data center(s) 102 via the external network(s) 118, and the orchestrator 116 may identify the restart based on the request received by the data center(s) 102.

In some cases, the orchestrator 116 may instruct the first host 104 to perform a conventional restart of the virtualized resource 108. For instance, the orchestrator 116 may initiate the conventional restart over the first host interface(s) 112. The conventional restart of the virtualized resource 108 can include removing the virtualized resource 108 from a reversed slot in the first resource(s) 106, designating a new slot within the first resource(s) 106 for the virtualized resource 108, and relaunching the virtualized resource 108 on the new slot within the first resource(s) 106 of the first host 104. During the conventional restart, the first resource(s) 106 may be at least partially scrubbed and/or reset, introducing a delay. In various examples, the virtualized resource 108 may be at least partially nonfunctional during the conventional restart. Accordingly, to conserve IP resources of the data center(s) 102, the virtualized resource 108 may lose an initial IP address and may be designated with a new IP address. According to some examples, the virtualized resource interface(s) 114 may be torn down and new interface(s) may be designated for the virtualized resource 108, introducing additional delays. In various implementations, the conventional restart may have a total latency of 1 to 10 minutes, during which the virtualized resource 108 is nonfunctional.

In addition to latency, the conventional restart may have other drawbacks. For instance, the processes of designating the virtualized resource 108 with a new IP address, scrubbing the first resource(s) 106, designating a new slot within the first resource(s) 106 to host the virtualized resource 108, and rebuilding the virtualized resource interface(s) 114 may utilize an unnecessary amount of computing resources in the data center(s) 102. Furthermore, in some cases, there may be insufficient available capacity (e.g., of the first resource(s) 106) to launch the virtualized resource 108 at the conclusion of the restart. In a conventional restart, the virtualized resource 108 may be stopped before the first host 104 determines that there is insufficient capacity within the first resource(s) 106 to relaunch the virtualized resource. Accordingly, the function of the virtualized resource 108 may be further interrupted by the restart process, at least until a sufficient capacity of the first host 104 is freed to launch the virtualized resource 108. For at least one of these reasons, the conventional restart may be undesirable.

In various implementations of the present disclosure, the orchestrator 116 may initiate a quick restart of the virtualized resource 108. During a quick restart process, the virtualized resource 108, and/or data associated with the virtualized resource 108, may be migrated to the second host 124 in the data center(s) 102, thereby occupying one or more second resources 126 of the second host 124. The second host 124 may be connected to the internal network(s) 110 via one or more second host interfaces 128.

In some cases, the orchestrator 116 may identify a request to restart the virtualized resource 108. The request may be transmitted to the orchestrator 116 from the first host 104, from the user device(s) 120, or a combination thereof. In various implementations, the request can identify various requested features of a type of host and/or amount of resources by which to launch the virtualized resource 108 after the restart. For example, the request may specify a sufficient capacity (e.g., in one or more types of resources) that the virtualized resource 108 has been requested (e.g., by the user) to occupy after the restart. In some cases, the sufficient capacity specified in the request may be different (e.g., a greater or smaller) than the amount of capacity within the first resource(s) 106 that the virtualized resource 108 occupies. Accordingly, the request to restart the virtualized resource 108 may be a request to upscale or downscale the amount of computing resources used to accommodate the virtualized resource 108.

According to various implementations, the orchestrator 116 may transmit a request for a suitable destination for the virtualized resource to the network manager 122. The network manager 122 may include a system configured to track the availability of computing resources within the data center(s) 102 and/or to reserve computing resources within the data center(s) 102. The request for the suitable destination may include criteria for the suitable destination. For example, the request for the suitable destination may specify the type of host and/or amount of resources in which the virtualized resource 108 is to be launched after the restart. In some cases, the request for the suitable destination may indicate the sufficient capacity of the virtualized resource 108.

In response to receiving the request for the suitable destination, the network manager 122 may identify, among multiple hosts within the data center(s) 102, a particular host that qualifies as a suitable target or destination for the virtualized resource 108. For example, the network manager 122 may identify, among the multiple hosts, at least one host that is the same type of host specified in the request for the suitable destination. In some cases, the network manager 122 may identify, among the multiple hosts, at least one host with enough available and/or idle capacity to accommodate the sufficient capacity to host the virtualized resource 108.

The network manager 122 may select the second host 124 among at least one host meeting the criteria for the suitable destination. In various implementations, the network manager 122 may reserve a slot in the second host 124 for the virtualized resource 108. For instance, the network manager 122 may update a datastore indicating that the slot in the second resource(s) 126 of the second host 124 is no longer available for virtualized resources other than the virtualized resource 108, which may prevent the network manager 122 from identifying the slot as available for another virtualized resource that may be migrated subsequently to the restart of the virtualized resource 108. The network manager 122 may return, to the orchestrator 116, a response indicating the second host 124. The response may further indicate that the slot has been reserved in the second resource(s) 126 for the virtualized resource 108.

According to various implementations of migration, the orchestrator 116 may cause data associated with the virtualized resource 108 can be transferred from the first host 104 to the second host 124. The data associated with the virtualized resource 108 may include state information corresponding to the virtualized resource 108, such as Complementary Metal Oxide Semiconductor (CMOS) block settings, clock settings, BIOS settings, or the like. In some instances, the state information can include one or more software and/or hardware settings set by a user account associated with the virtualized resource 108. In various implementations, the data associated with the virtualized resource 108 may include data stored in a local storage of the first host 104. In some examples, the virtualized resource 108 may maintain the same IP address, virtualized resource ID, or the like, before and after migration.

In various implementations of migration, the orchestrator 116 can cause the virtualized resource interface(s) 114 to be anchored from the first host 104 to the second host 124. For instance, the orchestrator 116 may cause one or more routers within the internal network(s) 110 to update routing tables associated with the virtualized resource interface(s) 114 to indicate that data addressed to the virtualized resource 108 should be transmitted to the second host 124, rather than the first host 104. Further, the communication resources (e.g., bandwidth, at least one bearer, scheduled transmission interval(s), or the like) within the internal network(s) 110 that have been previously reserved for transmissions to and/or from the virtualized resource 108 may remain reserved for the virtualized resource 108 before and after migration. In some cases, the network manager 122 may be responsible for allocating and/or reserving communication resources within the data center(s) 102. For instance, the network manager 122 may schedule transmissions throughout the internal network(s) 110, may cause routers and/or switches within the internal network(s) 110 to modify their routing tables, or the like. Upon migration of the virtualized resource 108, the orchestrator 116 may instruct the network manager 122 to maintain an allocation of communication resources to the virtualized resource interface(s) 114. Accordingly, the existing virtualized resource interface(s) 114 may be reattached from the first host 104 to the second host 124. The existing virtualized resource interface(s) 114 can be reattached without being torn down and rebuilt during migration.

In some examples, an interface may be "torn down" in a data center when at least one corresponding entry in a routing table of a router in the data center is deleted, when a communication resource associated with the interface is no longer allocated to the interface, or the like. In a conventional restart of a virtualized resource, an interface associated with the virtualized resource may be torn down, at least while the virtualized resource is nonfunctional during the latency of the conventional restart. An interface is rebuilt when communication resources of a data center are reallocated to a particular destination (e.g., the virtualized resource 108), such that at least one entry corresponding to the destination in a routing table of a router in the data center is added, a communication resource is newly allocated to the interface, or the like. Tearing down and rebuilding an interface can take minutes, in some cases. Reattaching the virtualized resource interface(s) 114 can be faster than tearing down and rebuilding the virtualized resource interface(s) 114.

Implementations in which the virtualized resource interface(s) 114 are reattached from the first host 104 to the second host 124 can be particularly advantageous in scenarios wherein there are a substantial number of the virtualized resource interface(s) 114 associated with the virtualized resource 108. For instance, if the virtualized resource 108 is a load balancer (e.g., an element responsible for balancing loads on various resources within the data center(s) 102), the virtualized resource 108 may be associated with a substantial number of virtualized resource interfaces 114. The substantial number of virtualized resource interfaces 114 may enable the load balancer to communicate with various elements within the data center(s) 102 (e.g., various hosts, switches, routers, and the like, in the data center(s) 102), in order to direct loads within and/or throughout the data center(s) 102. Tearing down and rebuilding the substantial number of virtualized resource interfaces 114 during a conventional restart could take a significant amount of time (e.g., at least multiple minutes). In contrast, reattaching the substantial number of virtualized resource interfaces 114 during a quick restart may take a relatively short amount of time (e.g., less than one minute).

Upon the conclusion of the quick restart process, the virtualized resource 108 may immediately launch on the second resource(s) 126 of the second host 124. In various cases, the latency associated with the quick restart can be shorter than the latency associated with a conventional restart. For instance, the quick restart can have an associated latency of less than one minute. In addition, because the IP address of the virtualized resource 108 and the virtualized resource interface(s) 114 are maintained, the quick restart may utilize fewer network resources than the conventional restart.

In various implementations, the quick restart process described herein can prevent the virtualized resource 108 from being restarted when there is insufficient capacity to relaunch the virtualized resource 108 after the restart is initiated. In various implementations, an available capacity of the second resource(s) 126 to accommodate the virtualized resource 108 may be confirmed prior to the virtualized resource 108 stopping (e.g., ending operations and vacating the reserved slot on the first resource(s) 106) on the first host 104 and prior to the migration of the virtualized resource 108 from the first resource(s) 106 to the second resource(s) 126. For instance, the orchestrator 116 and/or the network manager 122 can confirm and reserve the slot in the second resource(s) 126 corresponding to the sufficient capacity to accommodate the virtualized resource 108, in advance of the restart of the virtualized resource 108. If there is insufficient capacity to accommodate the virtualized resource 108 in the data center(s) 102 (e.g., in the second resource(s) 126 or resources of one or more other hosts within the data center(s)), the restart may be interrupted prior to the virtualized resource 108 stopping operations on the first host 108.

According to some implementations, the restart can be ceased or delayed until there is sufficient capacity in the second resource(s) 126 to accommodate the virtualized resource 108. According to some instances, a message indicating the paused and/or delayed restart may be returned to the user device(s) 120, which can be output to the user.

A particular example of implementations of the present disclosure will now be described with respect to FIG. 1. In the particular example, a user may be monitoring a performance of the virtualized resource 108, which may a real-time location service to various consumers. The virtualized resource 108 may occupy a first capacity of memory resources of the first host 104 to store data associated with the location service (e.g., to store maps of an environment) and may also utilize a second capacity of processing resources of the first host 104 to process data associated with the location (e.g., to process sensor data in order to identify the location of an object within the environment). The memory resources and/or the processing resources may be at least a portion of the first resource(s) 106 of the first host 104. In this example, the first host 104 may be a single physical server.

However, the user may be dissatisfied with the operation of the performance of the virtualized resource 108. For example, the first host 104 may be hosting another virtualized resource associated with a gaming platform whose resource utilization spikes every day between the hours of 4 PM and midnight, due to planned gaming events utilizing the gaming platform during that time period. Despite the enforcement of at least some resource isolation between the real-time location service and the gaming platform within the first host 104, due to the resource utilization spikes of the gaming platform, the processing resources of the first host 104 may be temporarily overallocated to the gaming platform by the first host 104, and the real-time location service may be temporarily starved from utilizing the full second capacity of the processing resources of the first server 104. Accordingly, the gaming platform may be a noisy neighbor to the real-time location service.

In some examples, the user may identify that the virtualized resource 108 has outgrown the first capacity of the memory resources of the first host 104 and the second capacity of the processing resources of the first host 104. For example, the number of consumers of the real-time location service may have dramatically increased, thereby making the first capacity and the second capacity insufficient to provide the real-time location service to the consumers in a low-latency manner. Accordingly, the user may seek to upscale the total amount of resources within the data center(s) 102 that are allocated and/or reserved for the virtualized resource 108.

In order to resolve the noisy neighbor problem and/or change (e.g., upscale) the amount of available resources for the virtualized resource 108, the user may request that the virtualized resource 108 be restarted. For example, the user may input a request to restart the virtualized resource 108 via a user interface output by the user device(s) 120. A message corresponding to the request may traverse the external network(s) 118 and enter the data center(s) 102. In some cases, the message may be received by the first host 104 via control-plane signaling within the data center(s) 102. In various examples, the message may be received by the orchestrator 116. For instance, the first host 104 may pass the message corresponding to the request to the orchestrator 116.

In some cases, the message corresponding to the restart request may specify a sufficient capacity of resources requested to host the virtualized resource 108. The message may specify various criteria for the requested slot accommodating the virtualized resource 108 after the restart. For example, if the user seeks to upscale the amount of available resources for the virtualized resource 108, the message may include a request for a greater memory capacity than the first capacity and/or a greater processing capacity than the second capacity. Accordingly, the orchestrator 116 may identify a sufficient capacity to host the virtualized resource 108 after restart based on the message corresponding to the restart request. In some cases, the orchestrator 116 may identify the sufficient capacity based on previous resource utilization by the virtualized resource 108. For example, the orchestrator 116 may track, in a datastore, previous amounts of resources allocated to and/or utilized by various virtualized resources hosted by the data center(s) 102.

In some cases, the orchestrator 116 may decide whether to restart the virtualized resource 108 directly on the first host 104, or whether to migrate the virtualized resource 108 to another host within the data center(s) 102. This decision may be based on the virtualized resource 108 itself. For example, in some cases, the orchestrator 116 may selectively migrate the virtualized resource 108 if the virtualized resource 108 is associated with less than a threshold amount of data stored in a local storage of the first host 104. For instance, if an amount of data comprised in the maps stored in the first capacity of the memory resources of the first host 104 is less than a threshold (e.g., 1 GB), the orchestrator 116 may decide to migrate the virtualized resource 108. If the amount of data comprised in the maps stored in the first capacity is at least the threshold, the expected time to migrate the data over the internal network(s) 110 may exceed the time of a conventional restart, migrating the data may be overly burdensome to the internal network(s) 110, or the like, and the orchestrator 116 may refrain from migrating the virtualized resource 108. The orchestrator 116 may identify the amount of data associated with the virtualized resource 108 by requesting a report of the memory utilization of the virtualized resource 108 from the first host 104. In some cases, the orchestrator 116 may track the amount data utilized by each one of a variety of virtualized resources hosted by the data center(s) 102 in a datastore and may refer to the datastore in order to identify the amount of data associated with the virtualized resource 108 that is stored in the memory resources of the first host 104.

Once the orchestrator 116 has decided to at least attempt to migrate the virtualized resource 108, the orchestrator 116 identify the second host 124, among multiple hosts in the data center(s) 102, as a destination for the virtualized resource 108. According to some instances, the orchestrator 116 may request the network manager 122 to identify a host that matches the type of host requested for the virtualized resource 108 and/or that has the sufficient capacity to host the virtualized resource 108. In some cases, the network manager 122 may refer to a datastore to identify the second host 124 as a host with an available capacity that is at least the sufficient capacity to accommodate the virtualized resource 108. For example, if the user seeks to maintain the virtualized resource 108 in a slot that has the first capacity and the second capacity, the network manager 122 may identify the second host 124 as a host with enough memory resources to accommodate the first capacity and enough available processing resources to accommodate the second capacity. Alternatively, if the user seeks to upscale the virtualized resource 108, the network manager 122 may identify the second host 124 as a host with enough available memory resources to accommodate a third capacity specified by the message corresponding to the restart request and/or enough available processing resources to accommodate a fourth capacity specified by the message, wherein the third capacity is greater than the first capacity and the fourth capacity is greater than the second capacity. Accordingly, the orchestrator 116 may identify a sufficient capacity (e.g., in the memory resources and/or processing resources of the second resource(s) 126) to accommodate the virtualized resource 108 after the virtualized resource 108 is restarted and seek to migrate the virtualized resource 108 to a host in which the sufficient capacity is available. In some cases, the network manager 122 may select the second host 124 among hosts that are similar (e.g., in type) to the first host 104. According to various examples, the network manager 122 may select the second host 124 among hosts that have the requested host type. Host types are described in more detail below with respect to FIG. 4.

Even though the network manager 122 may identify that the second host 124 should have enough available or idle capacity to accommodate the virtualized resource 108 after the virtualized resource 108 is restarted, the idle capacity of the second host 124 may change over time. Accordingly, network manager 122 may reserve a slot within the second resource(s) 126 with the sufficient capacity to accommodate the virtualized resource 108 in advance of the migration of the virtualized resource 108 to the second host 124. For example, the network manager 122 may maintain a datastore tracking available resources within the data center(s) 102, and may modify an entry corresponding to the second resource(s) 126 to indicate that the reserved slot is no longer available.

However, if the network manager 122 is unable to identify a host that is suitable for the destination of the virtualized resource 108 and/or is unable to reserve a slot for the virtualized resource 108, the network manager 122 may notify the orchestrator 116. Accordingly, the orchestrator 116 may at least temporarily halt the restart of the virtualized resource 108. At this stage, the virtualized resource 108 may continue to operate using the first resource(s) 106 of the first host 104. In some cases, the orchestrator 116 can return a message to the user device that denies the restart request. Thus, the virtualized resource 108 may not be stopped when there are conditions that would lead to an insufficient capacity error. In some cases, the orchestrator 116 may automatically seek, at a later time, to identify a host that can be a suitable destination for the virtualized resource 108 and restart the virtualized resource 108 at the later time.

If the network manager 122 successfully confirms that the slot with the sufficient capacity of the virtualized resource 108 is reserved in the second resource(s) 126, the orchestrator 116 may initiate migration of the virtualized resource 108 from the first host 104 to the second host 124. Data associated with the virtualized resource 108, such as state information as well as the data comprising the maps stored in the memory resources of the first host 104, may be transferred from the first host 104 to the second host 124 over the internal network(s) 110. For example, the data associated with the virtualized resource 108 may be transferred from the first host 104 to the second host 124 through the orchestrator 116. In some cases, the data associated with the virtualized resource 108 may be transferred over a peer-to-peer connection between the first host 104 and the second host 124. In addition, the orchestrator 116 may cause the virtualized resource interface(s) 114, which may carry input and output data associated with the real-time location service of the virtualized resource 108, to reattach from the first host 104 to the second host 124 without being torn down or reallocated.

Once the data associated with the virtualized resource 108 has been successfully transferred to the second host 124 and the virtualized resource interface(s) 114 are successfully reattached to the second host 124, the virtualized resource 108 may launch on the second host 124. The second host 124 may notify the orchestrator 116 that the virtualized resource 108 has been successfully launched. As a result, the orchestrator 116 can report, to the user device(s) 120 that the virtualized resource 108 has been successfully restarted. Although the virtualized resource 108 may be temporarily nonfunctional during the transfer of the data associated with the virtualized resource 108 from the first host 104 to the second host 124, the user and/or consumers of the real-time location service may experience the migration similarly to a restart of the virtualized resource 108 with minimal restart latency. In addition, after the migration, the virtualized resource 108 may no longer be starved by the noisy neighbor on the first host 104 and/or may occupy a slot in the second resource(s) 126 of the second host 124 that can adequately accommodate the additional consumers of the real-time location service. Further, a configuration (e.g., an IP address) of the virtualized resource 108 can be maintained during the migration.

Figure 2:
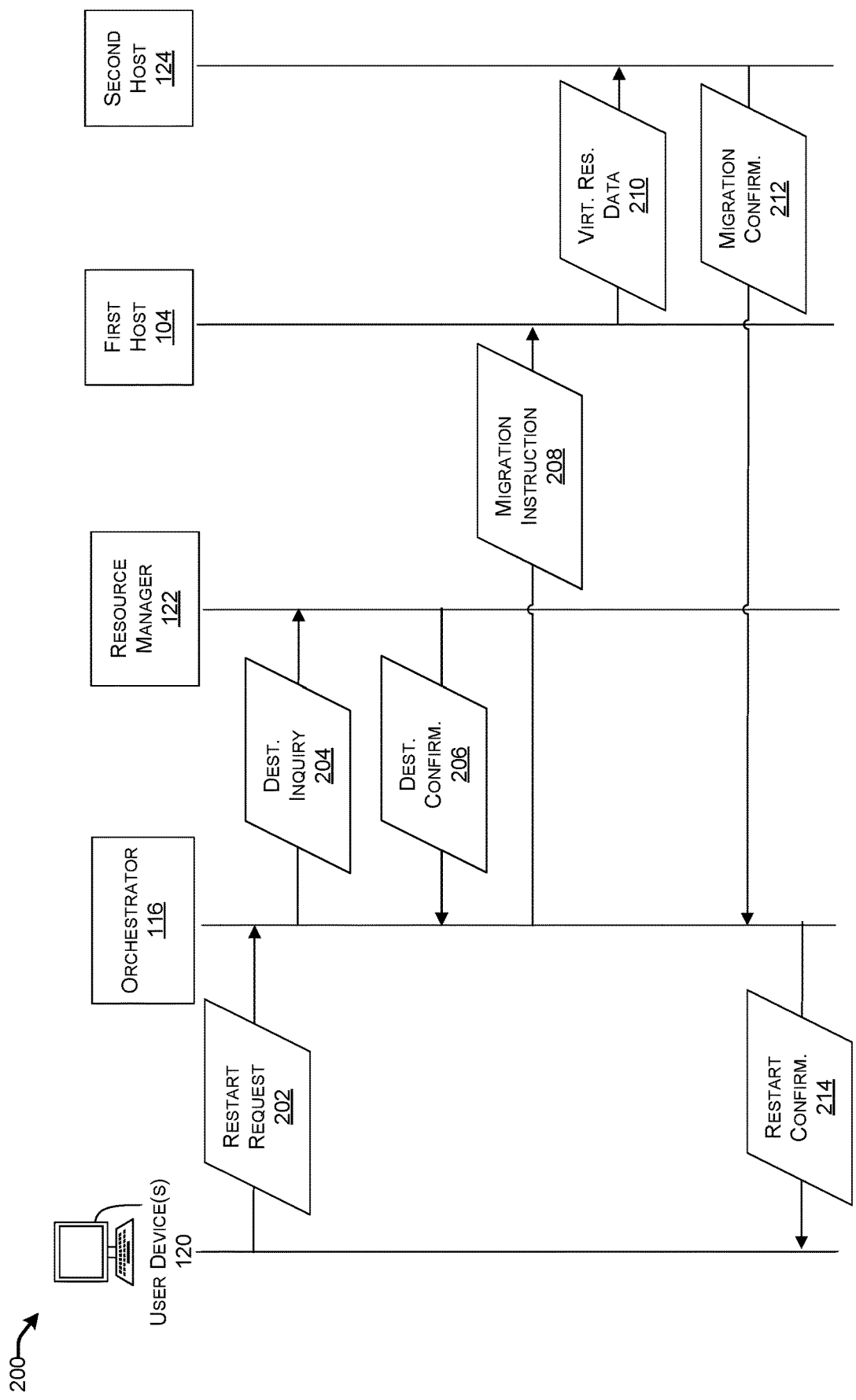
FIG. 2 illustrates example signaling for a quick restart of a virtualized resource using migration.

FIG. 2 illustrates example signaling 200 for a quick restart of a virtualized resource using migration. As illustrated, the signaling 200 can occur between the user device(s), the orchestrator 116, the network manager 122, the first host 104, and the second host 124, which are described above with reference to FIG. 1. The first host 104 may be hosting a virtualized resource (e.g., the virtualized resource 108 described above with reference to FIG. 1).

In various implementations, the user device(s) 120 may transmit, to the orchestrator 116, a restart request 202. For instance, the user device(s) 120 may receive a command to restart the virtualized resource from a user associated with the virtualized resource, via at least one user interface. In some examples, a user of the user device may request the restart of the virtualized resource in order to resolve a degraded performance of the virtualized resource (e.g., due to a noisy-neighbor of the virtualized resource on the first host 104). In particular instances, a user of the user device may request the restart of the virtualized resource in order to change a size of a slot in which the virtualized resource occupies. For example, the user may seek to increase or decrease resources available to the virtualized resource during operation of the virtualized resource.

The restart request 202 may indicate, to the orchestrator 116 that a restart of the virtualized resource should at least be attempted. In some cases, the restart request 202 may also inform the orchestrator 116 of at least one of the virtualized resource to be restarted (e.g., an IP address of the virtualized resource, a virtualized resource ID of the virtualized resource), of the first host 104 (e.g., an IP address of the first host 104, an ID of the first host 104, or the like). For instance, the restart request 202 may identify the virtualized resource and, in some cases, indicate processing and/or memory resources utilized by the virtualized resource (e.g., identifying the slot and/or resources of the first host 104 that the virtualized resource is occupying).

In various implementations, the restart request 202 may indicate a request to for a different capacity to accommodate the virtualized resource. For example, the restart request 202 may specify a capacity of at least one computing resources to host the virtualized resource after the restart, which may include a larger amount of computing resources than the capacity of the slot of the first host 104 that currently accommodates the virtualized resource. In some instances, the restart request 202 may specify a capacity of a new slot in computing resources to host the virtualized resource, which may be a smaller amount of computing resources than the capacity of the slot of the first host 104 that currently accommodates the virtualized resource. In some cases, a user account associated with the virtualized resource may increase or decrease the capacity of the slot(s) hosting the virtualized resource by modifying a subscription associated with the virtualized resource. The change in the amount of resources may be specified in the restart request 202.

In particular implementations, the orchestrator 116 may confirm that the virtualized resource is appropriate for migration. For instance, the orchestrator 116 may confirm that the virtualized resource is not associated with data stored in local storage in the first host 104. According to some implementations, the orchestrator 116 may selectively facilitate migrations of virtualized resources that are only associated with a minimal amount of data in local storage of their respective hosts, in order to prevent significant latencies during restart that may be associated with large data transfers. In some cases, the orchestrator 116 may confirm that the virtualized resource is associated with only a minimal amount of data in local storage. For instance, the orchestrator 116 may determine that an amount of stored data associated with the virtualized resource is below a particular threshold (e.g., one GB, 10 GB, or some other amount of data).

In various implementations, the orchestrator 116 can identify a destination for the virtualized resource, based on the restart request 202. The orchestrator 116 may transmit a destination inquiry 204 to the network manager 122. The destination inquiry 204 may identify at least one of the virtualized resource to be migrated or the first host 104. The destination inquiry 204 may further specify characteristics of a suitable destination for the virtualized resource, such as the sufficient capacity to accommodate the virtualized resource. In some cases, the network manager 122 may identify, among multiple hosts within the data center(s), the second host 124 as a suitable destination for the virtualized resource. For instance, the network manager 122 may identify the second host 124 as a host with sufficient available capacity to accommodate the virtualized resource. The network manager 122 may further reserve a slot for the virtualized resource within one or more resources of the second host 124.

Upon identifying the second host 124 and/or reserving a slot for the virtualized resource, the network manager 122 may return a destination confirmation 206 to the orchestrator 116. In various implementations, the destination confirmation 206 may identify the second host 124 as a suitable destination for the virtualized resource. For example, the destination confirmation 206 may include an IP address of the second host 124, a host ID that uniquely identifies the second host 124 within the data center(s), or the like. In some cases, the destination confirmation can further specify the reserved slot within the second host 124.

In response to receiving the destination confirmation 206, the orchestrator 116 may transmit a migration instruction 208 to the first host 104. Various techniques can be used to migrate the virtualized resource from the first host 104 to the second host 124. The migration instruction 208 may, in various examples, identify the virtualized resource. For example, the migration instruction 208 may include at least one of an IP address of the virtualized resource, a virtualized resource ID of the virtualized resource, at least one resource of the first host 104 in which the virtualized resource is occupying, a domain ID of the domain in which the virtualized resource is occupying, or the like.

In some implementations, the migration instruction 208 may include an instruction to establish a peer-to-peer connection between the first host 104 and the second host 124. For instance, the migration instruction 208 may include an indication of the second host 124 (e.g., the IP address of the second host 124, the host ID of the second host 124, or the like). In various cases, the migration instruction 208 can inform the first host 104 of the second host 124. For instance, the migration instruction 208 may include routing information, address information, port information, or the like, that may enable the first host 104 to exchange messages with the second host 124.

According to some implementations, the first host 104 may establish a peer-to-peer connection with the second host 124 in response to receiving the migration instruction 208. The first host 104 may exchange handshake messages with the second host 124. For instance, the handshake messages may include a request message transmitted from the first host 104, which may request the establishment of the peer-to-peer connection. The handshake messages may further include a response message transmitted from the second host 124 to the first host 104 and may confirm acceptance of the peer-to-peer connection. In some cases, the handshake messages can include an exchange of security keys, routing information, or the like. As a result of the exchange of handshake messages between the first host 104 and the second host 124, the peer-to-peer connection may be established between the first host 104 and the second host 124.

In various examples, the virtualized resource data 210 can be transferred from the first host 104 to the second host 124 The migration instruction 208 may be an instruction for peer-to-peer migration and may further instruct the first host 104 to establish the peer-to-peer connection and to directly transfer the virtualized resource data 210 over the peer-to-peer connection. The first host 104 may transmit virtualized resource data 210 to the second host 124 over the peer-to-peer connection. In various implementations, the peer-to-peer connection may bypass the orchestrator 116, such that the virtualized resource data 210 can be transmitted from the first host 104 directly to the second host 124 without the virtualized resource data 210 first being transferred to, and by, the orchestrator 116.

In some instances, because there may be existing interfaces between the orchestrator 116 and the first host 104, as well as between the orchestrator 116 and the second host 124, the migration instruction 208 may be an instruction for orchestrator-mediated migration and may instruct the first host 104 to transmit the virtualized resource data 210 to the orchestrator 116. In various implementations of orchestrator-mediated migration, the orchestrator 116 may forward the virtualized resource data 210 to the second host 124.

Once the virtualized resource data 210 has been fully transferred from the first host 104 to the second host 124, the second host 124 may transmit a migration confirmation 212 to the orchestrator 116. The migration confirmation 212, in some cases, may confirm that the virtualized resource data 210 has been successfully received by the second host 124. In response to receiving the migration confirmation 212, the orchestrator 116 may generate and transmit a restart confirmation 214 to the user device(s) 120. The restart confirmation 214 may indicate, to the user device(s) 120, that the virtualized resource has successfully restarted.

After the signaling 200 has concluded, the virtualized resource may be launched on the second host 124. In various implementations, the configuration of the virtualized resource (e.g., the IP address, virtualized resource ID, and the like) can be maintained during the signaling 200. Further, because the available capacity of the second host 124 can be identified in advance of the migration, an insufficient capacity error can be prevented during migration of the virtualized resource.

Figure 3:
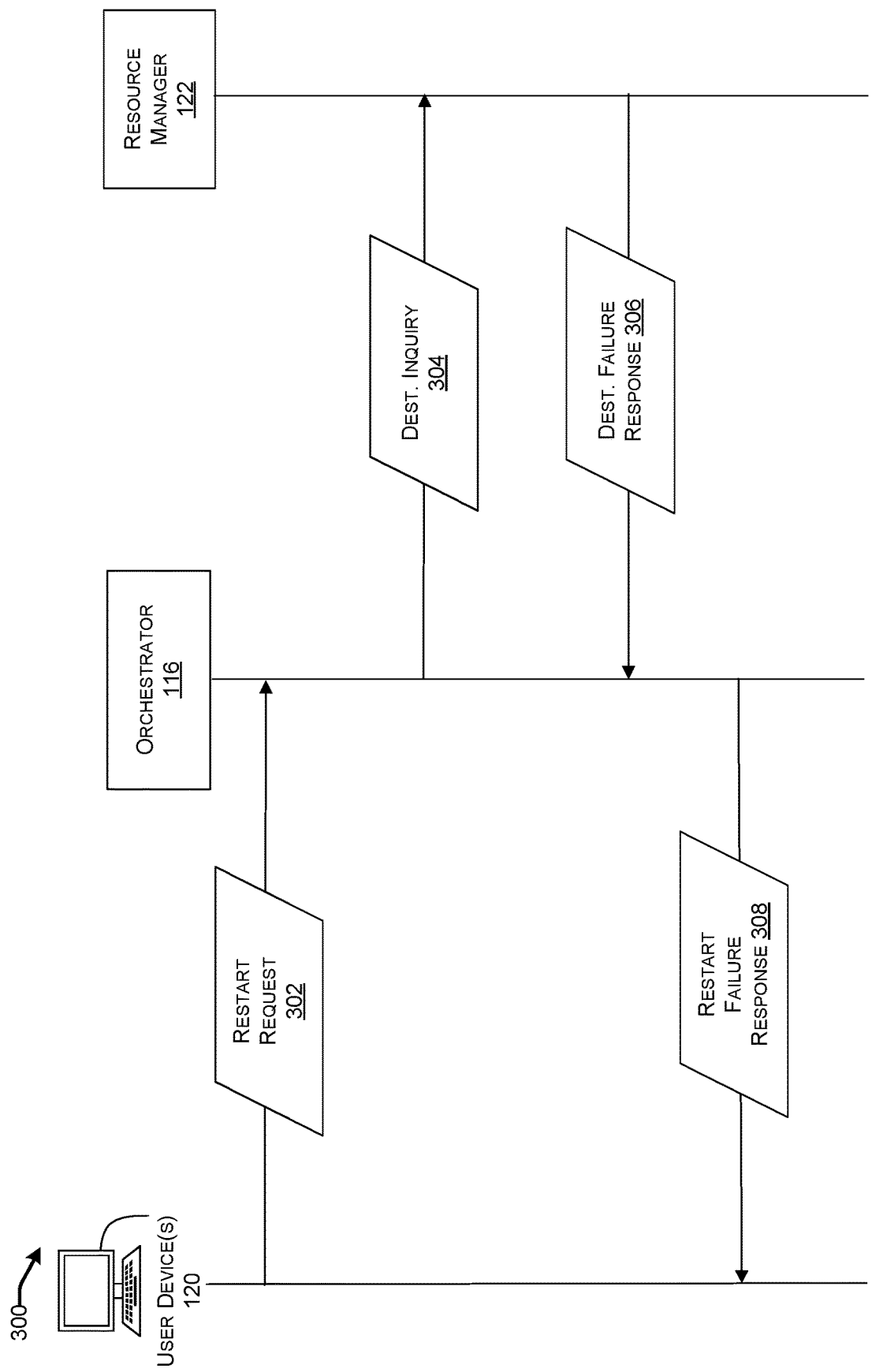
FIG. 3 illustrates example signaling for interrupting a quick restart of a virtualized resource when there is insufficient capacity to host the virtualized resource after migration.

FIG. 3 illustrates example signaling 300 for interrupting a quick restart of a virtualized resource when there is insufficient capacity to host the virtualized resource after migration. As illustrated, the signaling 300 occurs between the user device(s) 120, the orchestrator 116, and the network manager 122 described above with reference to FIG. 1. A first host (e.g., the first host 104 described above with reference to FIG. 1) may be hosting a virtualized resource (e.g., the virtualized resource 108 described above with reference to FIG. 1).

In various implementations, the user device(s) 120 may transmit, to the orchestrator 116, a restart request 302. For instance, the user device(s) 120 may receive a command to restart the virtualized resource from a user associated with the virtualized resource, via at least one user interface. In some examples, a user of the user device may request the restart of the virtualized resource in order to resolve a degraded performance of the virtualized resource (e.g., due to a noisy-neighbor of the virtualized resource on the first host 104). In particular instances, a user of the user device may request the restart of the virtualized resource in order to change a size of a portion of resources in which the virtualized resource occupies (e.g., to change the size of the domain and/or slot accommodating the virtualized resource). For example, the user may seek to increase or decrease resources available to the virtualized resource during operation of the virtualized resource.

The restart request 302 may indicate, to the orchestrator 116 that a restart of the virtualized resource should at least be attempted. In some cases, the restart request 302 may also inform the orchestrator 116 of at least one of the virtualized resource to be restarted (e.g., an IP address of the virtualized resource, a virtualized resource ID of the virtualized resource), of the first host 104 (e.g., an IP address of the first host 104, an ID of the first host 104, or the like). For instance, the restart request 302 may identify the virtualized resource and, in some cases, indicate processing and/or memory resources utilized by the virtualized resource (e.g., identifying the domain and/or resources of the first host 104 that the virtualized resource is occupying).

In various implementations, the restart request 302 may indicate a request to for a different capacity to accommodate the virtualized resource. For example, the restart request 302 may specify a capacity of at least one computing resources to host the virtualized resource after the restart, which may include a larger amount of computing resources than the capacity of the slot of the first host 104 that currently accommodates the virtualized resource. In some instances, the restart request 302 may specify a capacity of a new slot in computing resources to host the virtualized resource, which may be a smaller amount of computing resources than the capacity of the portion of resources of the first host 104 that currently accommodates the virtualized resource. In some cases, a user account associated with the virtualized resource may increase or decrease the capacity of the slot(s) hosting the virtualized resource by modifying a subscription associated with the virtualized resource. The change in the amount of resources may be specified in the restart request 202.

In particular implementations, the orchestrator 116 may confirm that the virtualized resource is appropriate for migration. For instance, the orchestrator 116 may confirm that the virtualized resource is not associated with data stored in local storage in the first host 104. According to some implementations, the orchestrator 116 may selectively facilitate migrations of virtualized resources that are only associated with a minimal amount of data in local storage of their respective hosts, in order to prevent significant latencies during restart that may be associated with large data transfers. In some cases, the orchestrator 116 may confirm that the virtualized resource is associated with only a minimal amount of data in local storage. For instance, the orchestrator 116 may determine that an amount of stored data associated with the virtualized resource is below a particular threshold (e.g., one GB, 10 GB, or some other amount of data).

In various implementations, the orchestrator 116 at least attempts to identify a destination for the virtualized resource, based on the restart request 302. The orchestrator 116 may transmit a destination inquiry 304 to the network manager 122. The destination inquiry 304 may identify the virtualized resource to be migrated or the first host 104. The destination inquiry 304 may further specify characteristics of a suitable destination for the virtualized resource, such as the sufficient capacity to accommodate the virtualized resource. In some cases, the network manager 122 may attempt to identify, among multiple hosts within the data center(s), a suitable destination for the virtualized resource. For instance, the network manager 122 may attempt to identify a host with sufficient available capacity to accommodate the virtualized resource.

In various implementations, the network manager 122 may be unable to identify a host within the data center(s) with sufficient available capacity to accommodate the virtualized resource. For example, the data center(s) may be fully occupied, such that no host within the data center(s) has enough available capacity to accommodate the virtualized resource. The network manager 122 may therefore transmit, to the orchestrator 116, a destination failure response 306. The destination failure response 306 may indicate, to the orchestrator 116, that there is insufficient capacity in the data center(s) to restart and/or relaunch the virtualized resource. In various examples, the destination failure response 306 may indicate that migration of the virtualized resource to the second host 124 would be unsuccessful.

In response to receiving the destination failure message 306, the orchestrator 116 may transmit, to the user device(s) 120, a restart failure response 308. The restart failure response 308 may indicate that the requested restart was unsuccessful and/or delayed. According to some instances, the user device(s) 120 may output (e.g., display) an indication that the restart has been ceased, interrupted, and/or delayed.

In various implementations, upon receiving the destination failure response 306, the orchestrator 116 may wait a particular time period before automatically retransmitting the destination inquiry 304 to the network manager 122. In various implementations, at least one host within the data center(s) may have sufficient capacity to accommodate the virtualized resource after the particular time period. Accordingly, the requested restart may proceed, but may be delayed.

Figure 4:
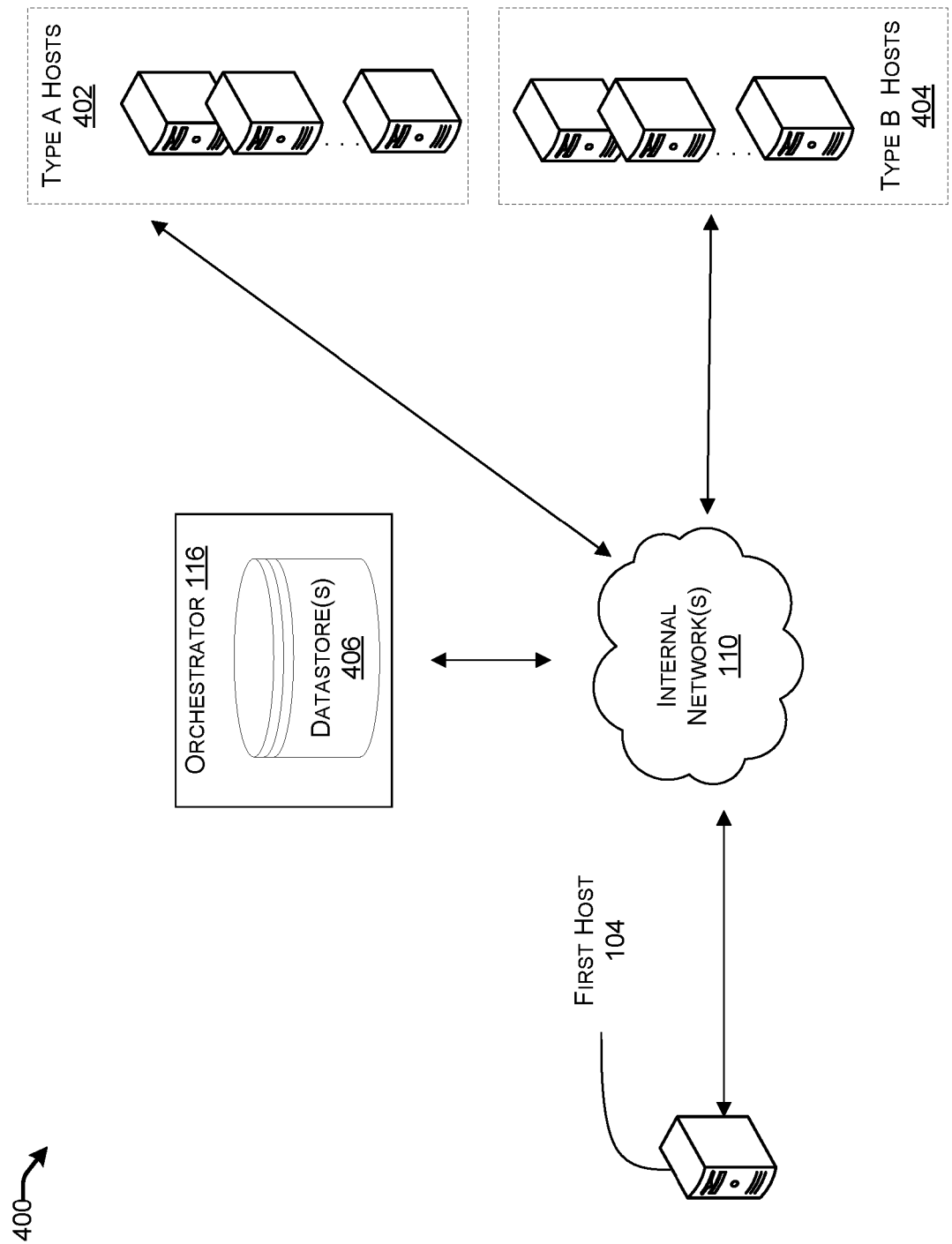
FIG. 4 illustrates an example environment of at least one data center with a variety of different types of hosts. A virtualized resource that is being restarted may be migrated between different types of hosts or the same type of hosts.

FIG. 4 illustrates an example environment 400 of at least one data center with a variety of different types of hosts. Various elements discussed above with reference to FIGS. 1, 2, and 2, such as the first host 104, the internal network(s) 110, and the orchestrator 116, will also be described with reference to the example environment 400 of FIG. 4.

The environment 400 may include multiple Type A hosts 402. The Type A hosts 402 may include various hosts. As used herein, a "type" of host may refer to one or more features of the host, such as at least one of a processing capability of the host, a memory capacity of the host, a vendor of the host, an OS of the host, a version of software running on the host (e.g., whether the host is running a particular update of software running on the host), or the like. The Type A hosts 402 may include multiple hosts with at least similar processing capabilities. For instance, each one of the Type A hosts 402 may include a processor with a processor speed that is within a predetermined range, or a processor speed that is equal to or greater than a certain processing speed. The Type A hosts 402 may include multiple hosts with at least similar memory capacities. For instance, each one of the Type A hosts 402 may include a memory device capable of storing an amount of bytes within a predetermined range, or an amount of storage/bytes that is greater than or equal to a particular amount of storage/bytes. In some cases, each one of the Type A hosts 402 may be produced and/or distributed by the same manufacturer or distributor (or by different manufacturers/distributors). According to some instances, each one of the Type A hosts 402 may be running software (e.g., an OS) with the same update. In various implementations, the Type A hosts 402 may have the same or similar capabilities.

The environment 400 may further include multiple Type B hosts 404. In various implementations, the Type B hosts 404 may have the same or similar capabilities. In some cases, the Type B hosts 404 may include multiple hosts with at least similar processing capabilities. For instance, each one of the Type B hosts 404 may include a processor with a processor speed that is within a predetermined range, or a processor speed that is equal to or greater than a certain processing speed. The Type B hosts 404 may include multiple hosts with at least similar memory capacities. For instance, each one of the Type B hosts 404 may include a memory device capable of storing an amount of bytes within a predetermined range, or an amount of storage/bytes that is greater than or equal to a particular amount of storage/bytes. In some cases, each one of the Type B hosts 404 may be produced by the same manufacturer or distributor (or by different manufacturers/distributors). According to some instances, each one of the Type B hosts 404 may be running software (e.g., an OS) with the same update. In various implementations, the Type B hosts 404 may have the same or similar capabilities.

The Type A hosts 402 may have different capabilities than the Type B hosts 404. For instance, the Type A hosts 402 may include faster (or a greater number of) processors and/or larger (or a greater number of) memory devices than the Type B hosts 404. In some cases, the Type A hosts 402 may be manufactured by a different vendor than the Type B hosts 404. Accordingly, a virtualized resource hosted by the Type A hosts 402 may have a different performance than an equivalent virtualized resource hosted by the Type B hosts 404.

The orchestrator 116 may communicate with the Type A hosts 402, the Type B hosts 404, and/or the first host 104 over the internal network(s) 110. When the orchestrator 116 receives a request to restart a virtualized resource hosted by the first host 104, the orchestrator 116 may identify a destination for the virtualized resource among the Type A hosts 402 and/or the Type B hosts 404. For instance, the orchestrator 116 may request that a network manager (e.g., the network manager 122), which may be tracking available capacity of the Type A hosts 402 and/or the Type B hosts 404, a suitable destination for the virtualized resource.

In various implementations, the orchestrator 116 may facilitate migration of a virtualized resource from the first host 104 to another host with similar capabilities. For instance, if the first host 104 is a Type A host, the orchestrator 116 may identify the destination for the virtualized resource among the Type A hosts 402 (e.g., via the network manager). Similarly, if the first host 104 is a Type B host, the orchestrator 116 may identify the destination for the virtualized resource among the Type B hosts 404. Accordingly, in some cases, the virtualized resource can maintain its performance before and after migration.

In some examples, the orchestrator 116 may facilitate migration of a virtualized resource from the first host 104 to another host with different capabilities than the first host 104. For instance, the orchestrator 116 may identify that the restart request includes a request different resources for the virtualized resource. In various implementations, the first host 104 may be a Type B host, the virtualized resource may be migrated to a Type A host with different (e.g., better) processing capabilities, memory capabilities, or the like. Accordingly, the restart can be used as an opportunity to change the resources utilized by the virtualized resource.

The orchestrator 116 may further maintain one or more datastores 406 to facilitate quick restarts using migration. In some cases, the datastore(s) 406 may track information about various hosts within the data center(s), various virtualized resources within the data center(s), or the like.

Figure 5:
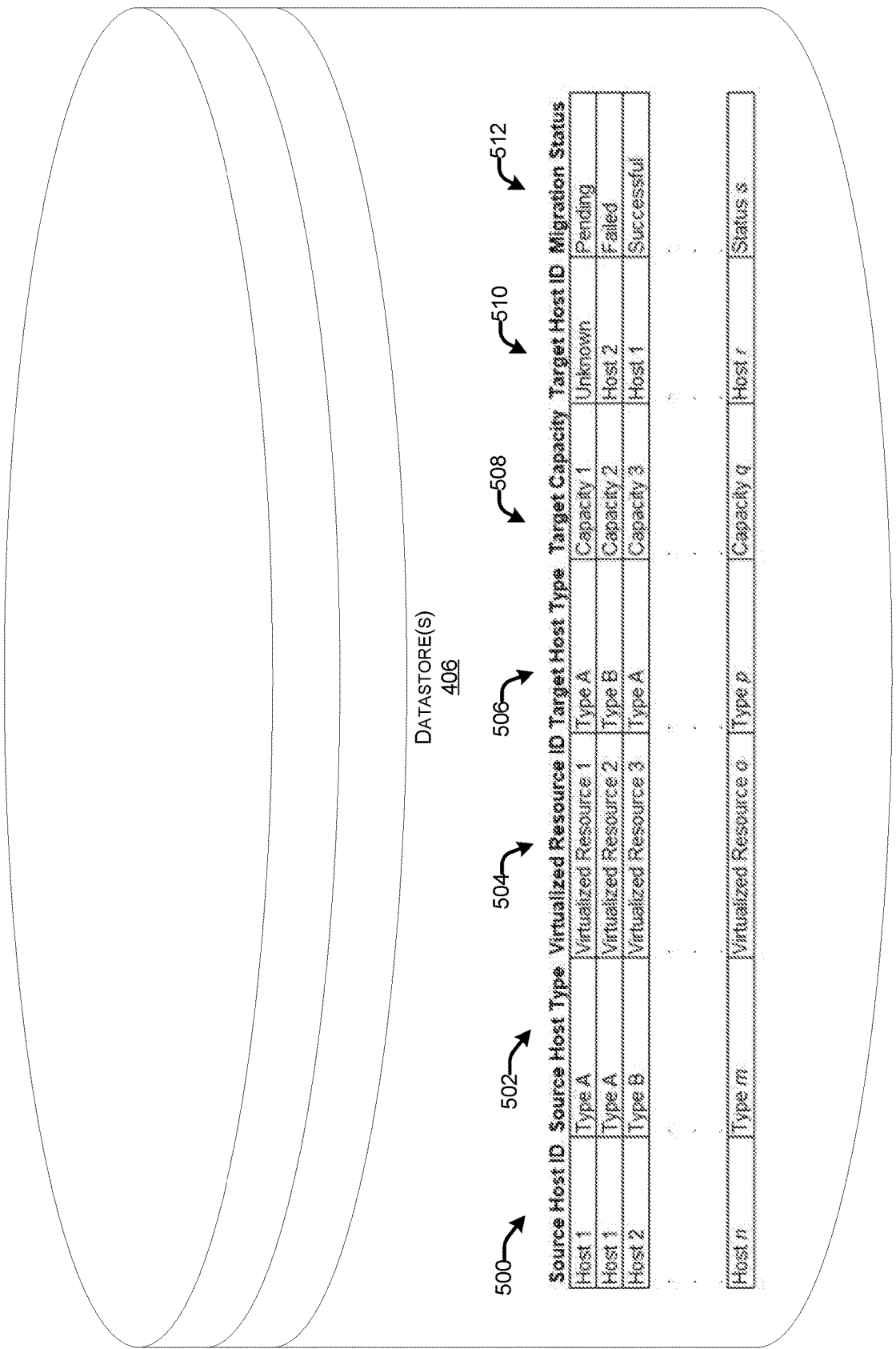
FIG. 5 illustrates an example of a datastore that an orchestrator can use to track virtualized resources and hosts in one or more data centers, in order to facilitate migration of the virtualized resources between the hosts during quick restarts.

FIG. 5 illustrates an example of the datastore(s) 406 maintained by an orchestrator (e.g., the orchestrator 116 described above with reference to FIGS. 1 to 4). As illustrated in FIG. 5, the datastore(s) 406 may include multiple entries associated with individual hosts and/or virtualized resources in at least one data center (e.g., the data center(s) 102 described above with reference to FIG. 1). The datastore(s) 406 may include seven fields: a source host ID field 500, a source host type field 502, a virtualized resource ID field 504, a target host type field 506, a target capacity field 508, a target host ID field 510, and a migration status field 512.

The source host ID field 500 may include an identifier of the source host of a virtualized resource corresponding to the entry. The source host ID field 500 for a given entry may include at least one of a unique identifier for the host within the data center(s), an IP address of the host, routing information (e.g., port numbers, etc.) associated with interfaces attached to the host, or the like.

The source host type field 502 may include an identifier of the type of source host corresponding to the entry. In various implementations, the type may identify at least one type of resource utilized by the host. For instance, as illustrated in FIG. 5A, the host type field 502 may specify whether a host corresponding to a given entry is a Type A host or a Type B host.

The virtualized resource ID field 504 may include an identifier of the virtualized resource corresponding to the entry. The virtualized resource ID field 504 for a given entry may include at least one of a unique identifier for the virtualized resource within the data center(s), an IP address of the virtualized resource, routing information (e.g., port numbers, etc.) associated with interfaces attached to the virtualized resource, or the like.

The target host type field 506 may include an identifier of the type of destination host requested for the virtualized resource corresponding to the entry. In various implementations, the type may identify at least one type of resource utilized by the destination host. For instance, as illustrated in FIG. 5A, the host type field 502 may specify whether a destination host corresponding to a given entry is a Type A host or a Type B host.

The target capacity field 508 may indicate a capacity of at least one resource that the corresponding virtualized resource is requested to occupy (e.g., by a user) after restart. For instance, the target capacity field 508 may specify at least one of an amount of memory resources, an amount of processing resources, an amount of cache resources, an amount of service resources, or another type of resource, that is requested for the corresponding virtualized resource in a destination host. If an upscaled or downscaled capacity for a particular virtualized resource is requested (e.g., in a restart request of the virtualized resource), the target capacity field 508 can correspond to the upscaled or downscaled capacity.

The target host ID field 510 may include an identifier of the target host of a virtualized resource corresponding to the entry. The target host ID field 510 for a given entry may include at least one of a unique identifier for the target host within the data center(s), an IP address of the host, routing information (e.g., port numbers, etc.) associated with interfaces attached to the host, or the like.

The migration status field 512 may include an indicator of the status of a migration of the virtualized resource corresponding to the entry. For instance, if a restart of a virtualized resource has been requested, but the virtualized resource has not been fully transferred to a target host, the migration status field 512 may indicate that the migration of the virtualized resource is "pending." If a restart of a virtualized resource has been requested, but the virtualized resource was unsuccessfully migrated to a target host, the migration status field 512 may indicate that the migration of the virtualized resource has "failed." Further, if a restart of a virtualized resource has been requested and the virtualized resource has been successfully migrated to a new host, the migration status field 512 may indicate that the migration is "successful."

The orchestrator may utilize the datastore(s) 406 to track and/or facilitate quick restarts of virtualized resources within the data center(s). For instance, the orchestrator may generate an entry within the datastore(s) 406 corresponding to "Virtualized resource 1" in response to receiving a restart request corresponding to "Virtualized resource 1." The restart request may specify that "Virtualized resource 1" is currently occupying "Host 1," which may be of "Type A." The restart request may further specify that the user of "Virtualized resource 1" has requested that "Virtualized resource 1" be launched on a target host of "Type A" in a slot with a capacity of "Capacity 1." The orchestrator may request a resource manager to identify a suitable target host that is of "Type A" and that has an available slot with a capacity of "Capacity 1." Until the resource manager indicates the suitable target host, the target host ID for "Virtualized resource 1" may be "Unknown" and the migration status of "Virtualized resource 1" may be "Pending."

In some examples, the datastore(s) 406 may include an entry corresponding to "Virtualized resource 2," which may currently be occupying "Host 1." A restart request corresponding to "Virtualized resource 2" may indicate that a user associated with "Virtualized resource 2" would like "Virtualized resource 2" to launch on a target host of "Type B" in a slot with a capacity of "Capacity 2." Upon request by the orchestrator, the resource manager may identify that "Host 2" matches the requested criteria for the target host of "Virtualized resource 2." However, for some reason, the migration of "Virtualized resource 2" may have "Failed." For instance, the resource manager may have been unable to reserve a suitable slot within "Host 2" for the "Virtualized resource 2." In some cases, the orchestrator may return, to a device associated with the user, an indication that the restart of "Virtualized resource 2" has failed. Despite the migration failure, "Virtualized resource 2" may continue to operate, uninterrupted, on "Host 1."

According to some instances, "Virtualized resource 3" may have successfully migrated from "Host 2" of "Type B" to "Host 1" of "Type A." For instance, the resource manager may have determined, upon request by the orchestrator, that "Host 1" may have the target host type of "Type A" and an available capacity to accommodate the target capacity of "Capacity 3." In some cases, the orchestrator may return, to a device associated with the user, an indication that the restart of "Virtualized resource 3" was successful.

Figure 6:
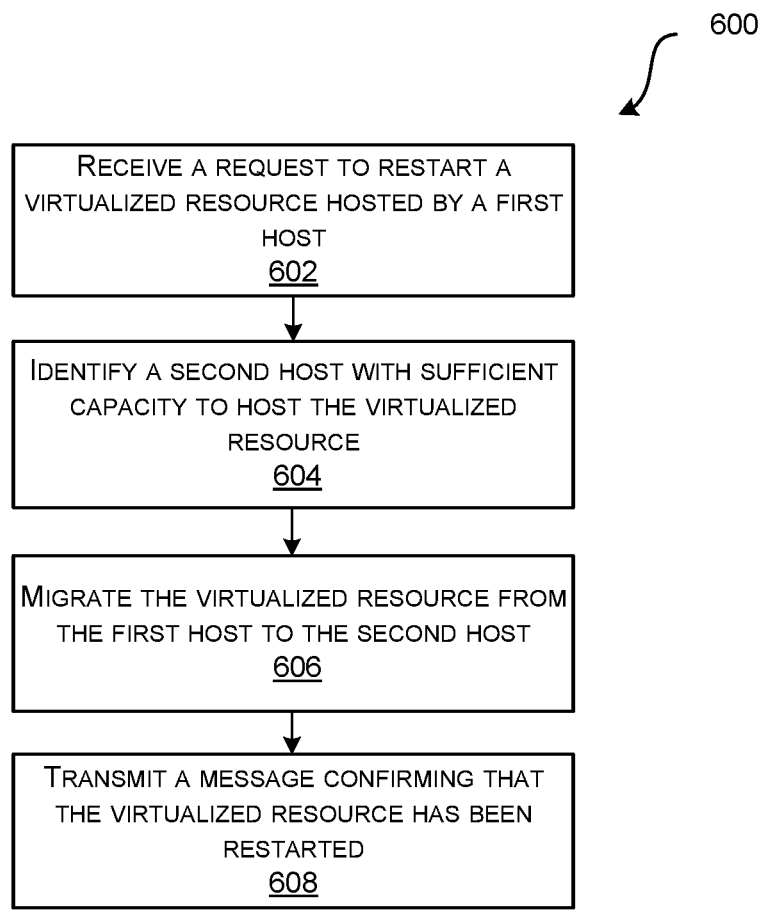
FIG. 6 illustrates an example process for facilitating a quick restart of a virtualized resource using migration and confirming that the virtualized resource has been restarted.

FIG. 6 illustrates an example process 600 for performing a quick restart of a virtualized resource. In various implementations, the process 600 can be performed by at least one of an orchestrator (e.g., the orchestrator 116 described above with reference to FIGS. 1 to 4) or a resource manager (e.g., the network manager 122 described above with reference to FIGS. 1 to 3). For example, the process 600 can be performed by one or more servers in an environment including at least one data center.

At 602, a request to restart a virtualized resource hosted by a first host may be received. In various examples, the virtualized resource may be hosted in one or more first resources in the first host. In various implementations, the request may be received from a user device associated with the virtualized resource. In some cases, the request may originate outside of the data center(s).

At 604, a second host with sufficient capacity to host the virtualized resource may be identified. In some cases, the entity performing the process 600 can request another entity to determine the second host among multiple hosts within the data center(s). In some instances, entity performing the process 600 can refer to one or more datastores, which may be locally stored and/or accessed remotely to identify the second host. The datastore(s) may include various entries corresponding to different hosts and/or virtualized resources within the data center(s). In some cases, the second host may be selected among hosts that have sufficient available capacity to accommodate the virtualized resource. In some cases, a slot in the second host may be reserved for the virtualized resource.

At 606, the virtualized resource may be migrated from the first host to the second host. For example, a request to transfer data associated with the virtualized resource to the second host may be transmitted to the first host. In various implementations, operations of the virtualized resource may be stopped, data associated with the virtualized resource may be transferred from the first host to the second host over one or more internal networks in the data center(s), and the virtualized resource may be restarted on the second resource(s) of the second host. In some cases, the data associated with the virtualized resource may be transferred from the first host to the second host over a peer-to-peer connection, or may be relayed from the first to the second host by the entity performing the process 600.

At 608, a message confirming that the virtualized resource has been restarted may be transmitted. In various implementations, the message may be transmitted from the data center(s), over one or more external networks, to at least one user device associated with the virtualized resource. For example, the message may be transmitted to the user device that requested that the virtualized resource be restarted.

Figure 7:
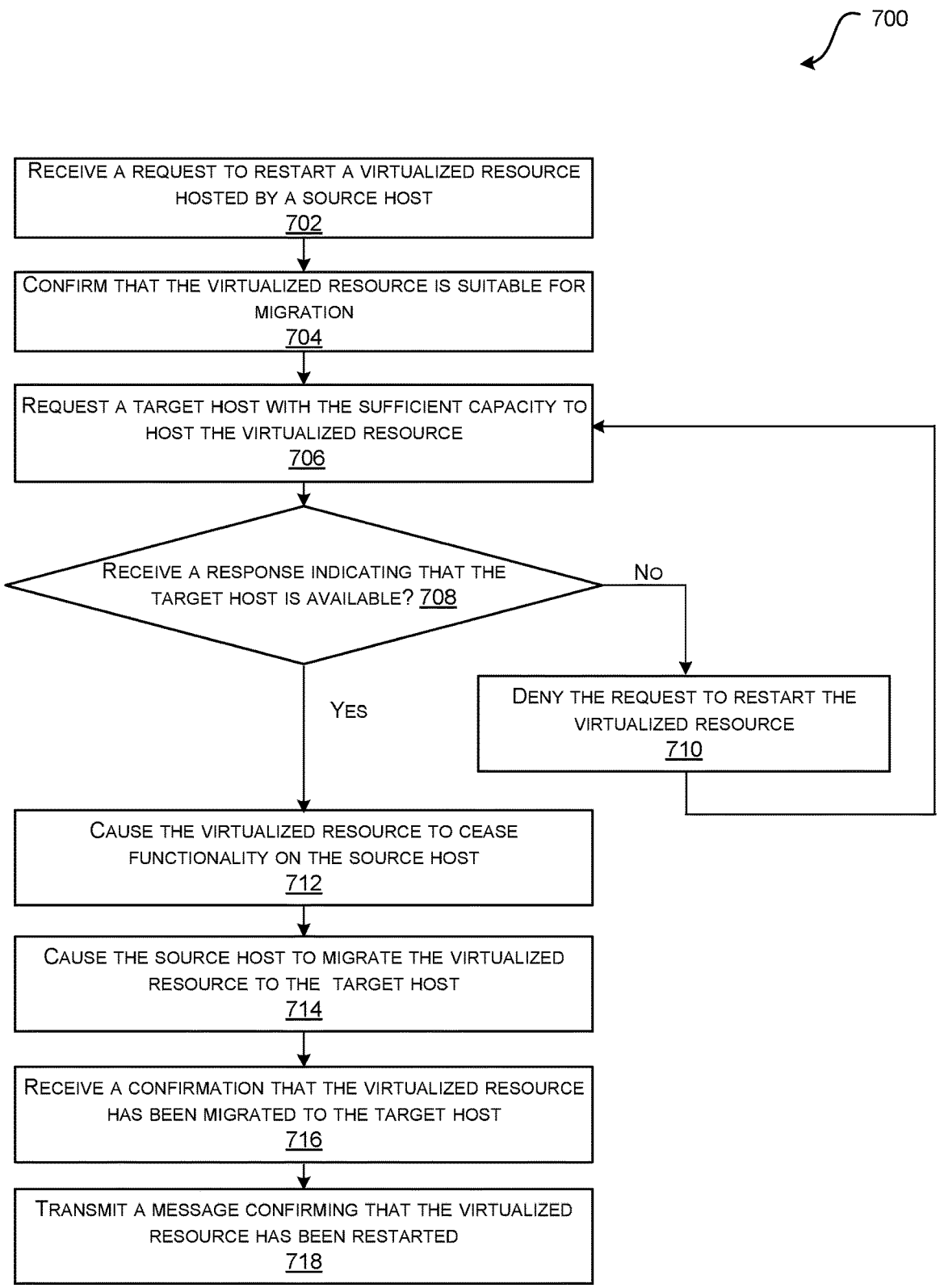
FIG. 7 illustrates an example process for facilitating a quick restart of a virtualized resource by migrating the virtualized resource to a destination after confirming that the destination has sufficient capacity to accommodate the virtualized resource.

FIG. 7 illustrates an example process 700 for performing a quick restart of a virtualized resource. In various implementations, the process 700 can be performed by at least one of an orchestrator (e.g., the orchestrator 116 described above with reference to FIGS. 1 to 4) or a network manager (e.g., the network manager 122 described above with reference to FIGS. 1 to 3). For example, the process 600 can be performed by one or more servers in at least one data center.

At 702, a request to restart a virtualized resource hosted by a source host may be received. The virtualized resource may occupy at least a portion of one or more first resources of the source host. In various implementations, the request may be received from a user device associated with the virtualized resource. The user device may be outside of the data center(s), such that the request may be transmitted to the data center(s) over one or more external networks.

At 704, the virtualized resource may be confirmed as suitable for migration. In various implementations, an amount of data associated with the virtualized resource may be compared to a particular threshold (e.g., one MB, one GB, or some other amount of data). The virtualized resource may be confirmed as suitable for migration if the data associated with the virtualized resource is no more than the particular threshold.

At 706, a sufficient capacity to host the virtualized resource may be identified. In various implementations, the sufficient capacity may be the previous capacity of the first portion of the resources that the virtualized resource previously occupied in the source host. For example, the entity performing the process 700 may determine identify a previous capacity utilized by the virtualized resource by accessing an entry in one or more datastores. In some implementations, the sufficient capacity may be identified based on the request received at 702. In various examples, the request may be for a portion of resources with a different (e.g., larger or smaller) amount of capacity than the capacity of the portion of the first resources that was previously utilized by the virtualized resource in the source host.

A target host with the sufficient capacity to host the virtualized resource is requested. In some implementations, the target host may be requested according to various criteria. For example, the target host may be requested to have at least one of an available capacity that is at least as large as the sufficient capacity to host the virtualized resource, a particular type, a particular processing capability that is within a predefined range, a memory capacity that is within a predefined range, a particular vendor, a particular OS, a particular version of software, or the like. In some cases, the requested target host may be at least similar to the source host. In various instances, the entity performing the process 700 may transmit, to a network manager, a request to identify the target host. The request may indicate the various criteria. In response to receiving the request, the network manager may at least attempt to identify a suitable target host that satisfies the various criteria.

At 708, the process 700 may include receiving a response and determining whether the response indicates that the target host is available. In various implementations, the network manager may track available capacity of multiple hosts within the data center(s). According to some examples, the network manager may at least attempt to identify the target host among the multiple hosts based on the various criteria specified by the entity performing the process 700. However, in some examples, the network manager may be unable to identify the target host within the data center(s). For instance, none of the hosts within the data center(s) may satisfy the various criteria of the target host. Accordingly, the network manager may return, to the entity performing the process 700, a response indicating that the target host is unavailable. The process 700 may continue to 710.

At 710, the entity performing the process 700 may deny the request to restart the virtualized resource. For example, a restart failure response may be returned to the user device. The restart failure response may indicate that the attempt to restart the virtualized resource was unsuccessful. In various implementations, the virtualized resource may be operating continuously throughout 702 to 710. Accordingly, the failure to restart the virtualized resource may not disrupt existing operations of the virtualized resource. After 710, the process 700 may return to 706, in which an effort to identify the target host may be reattempted.

On the other hand, in some cases, the network manager may successfully identify the target host within the data center(s). In some cases, a slot in the target host with the sufficient capacity can be reserved for the virtualized resource in advance. In some cases, the network manager may reserve the slot in the target host. The response provided by the network manager may indicate that the target host is available. For instance, the response may identify the target host (e.g., an IP address, a host ID, or the like, of the target host) and/or that the slot is reserved in the target host for the virtualized resource. Upon identifying that the response indicates that the target host is available at 708, the process 700 may continue to 712.

At 712, the entity performing the process 700 may cause the virtualized resource to cease functionality on the source host. In some cases, the entity performing the process 700 may transmit, to the source host, a request to cease functionality of the virtualized resource. Upon ceasing the functionality of the virtualized resource, the source host may prevent the virtualized resource from executing operations using processing resources of the source host. At this stage, the user of the virtualized resource may experience the virtualized resource as temporarily nonoperational. At 714, the entity performing the process 700 may cause the source host to migrate the virtualized resource to the target host. For example, the entity performing the process 700 may transmit, to the source host, a migration instruction. The migration instruction may identify the target host and/or the reserved slot in the target host for the virtualized resource. In response to receiving the migration instruction, the source host may migrate the virtualized resource to the target host. For instance, the source host may transmit data associated with the virtualized resource to the target host. In some cases, the data may be transmitted over a peer-to-peer connection between the source host and the target host. In some cases, the entity performing the process 700 may relay the data between the source host and the target host. Once the data associated with the virtualized resource is transferred to the target host, the virtualized resource may resume functionality on the target host.

At 716, a confirmation that the virtualized resource has been migrated may be received. The confirmation may be received from the target host. The confirmation may indicate that the virtualized resource occupies the target host and/or that the operations of the virtualized resource have resumed on the target host. In various implementations, the data associated with the virtualized resource may be deleted from the source host, such that the portion of resources of the source host, in which the virtualized resource originally occupied, may be used to host a different virtualized resource.

At 718, a message confirming that the virtualized resource has been restarted may be transmitted. In various implementations, the message may be transmitted to the user device that has requested the restart.

According to various implementations, processes 600 and 700 can be used to perform a quick restart a virtualized resource in a cloud-based environment. Unlike a conventional restart, in which the virtualized resource could remain on the same host, the quick restart can be used to resume operations of the virtualized resource relatively quickly (e.g., in under a minute), maintain a configuration (e.g., IP address) of the virtualized resource, conserve network resources (e.g., by maintaining the configuration of the virtualized resource and redefining network interfaces associated with the virtualized resource), and prevent an insufficient capacity error from being triggered.

Figure 8:
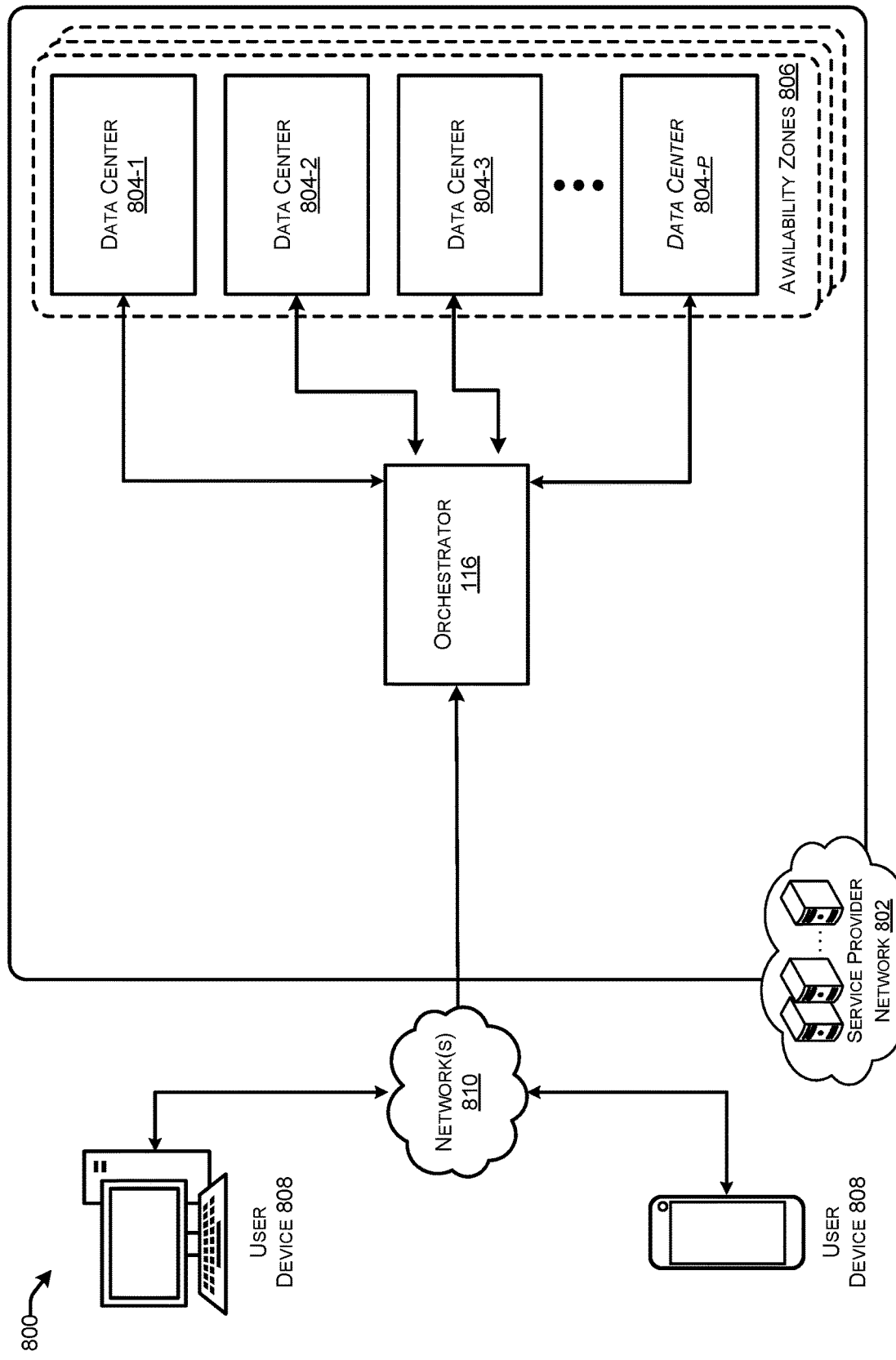
FIG. 8 is a system and network diagram showing an illustrative operating environment that includes a service provider network, which can be configured to implement aspects of various functionalities described herein.

FIG. 8 is a system and network diagram showing an illustrative operating environment 800 that includes a service provider network 802, which can be configured to implement aspects of various functionalities described herein. The service provider network 802 can provide virtualized computing resources, like Virtual Machine (VM) instances and storage, on a permanent or an as-needed basis.

Among other types of functionality, the computing resources provided by the service provider network 802 may be utilized to implement various services described above. For instance, the computing resources provided by the service provider network 802 can include various types of computing resources, such as data processing resources like VM instances, data storage resources, networking resources, data communication resources, network services, and the like. In some cases, the computing resources are provided via servers within the service provider network 802.

Each type of computing resource provided by the service provider network 802 can be general-purpose or can be available in a number of specific configurations. For example, data processing resources can be available as physical computers or VM instances in a number of different configurations. The VM instances can be configured to execute applications, including web servers, application servers, media servers, database servers, gaming applications, and/or other types of programs. Data storage resources can include file storage devices, block storage devices, and the like. The service provider network 802 can also be configured to provide other types of computing resources not mentioned specifically herein.

The computing resources provided by the service provider network 802 may be enabled in some implementations by one or more data centers 804-1 to 804-*p*, wherein p is a positive integer. The data center(s) 804-1 to 804-*p* might be referred to herein singularly as "a data center 804" or in the plural as "the data centers 804"). The data centers 804 are facilities utilized to house and operate computer systems and associated components. The data centers 804 can include redundant and backup power, communications, cooling, and security systems. The data centers 804 can also be located in geographically disparate locations, or regions. One region may include multiple availability zones 806. A region can be defined as a geographical area in which the cloud provider network 802 clusters data centers 804. Each region can include two or more availability zones 806 connected to one another via a private high-speed network, for example a fiber communication connection. An availability zone can refer to an isolated failure domain including one or more data center facilities with separate power, separate networking, and separate cooling from those in another availability zone. In some cases, availability zones 806 within a region may be positioned far enough away from one other that the same natural disaster should not take more than one availability zone 806 offline at the same time. One illustrative embodiment for a data center 804 that can be utilized to implement the technologies disclosed herein will be described below with regard to FIG. 9.

Various user devices 808 that utilize the service provider network 802 may access the computing resources provided by the service provider network 802 over any wired and/or wireless network(s) 810, which can be a Wide Area Network (WAN), such as the Internet, an intranet or an Internet Service Provider (ISP) network or a combination of such networks. In some cases, network(s) 810 may include a cloud-based network. In some examples, without limitation, a user device 808 operated by a client of the service provider network 802 may be utilized to access the service provider network 802 by way of the network(s) 810. It should be appreciated that a Local Area Network (LAN), the Internet, or any other networking topology known in the art that connects the data centers 804 to remote clients and other users can be utilized. It should also be appreciated that combinations of such networks can also be utilized.

In particular implementations, the user device 808 may utilize resources of a host in a first data center 804-1 among the data centers 804 via a virtualized resource hosted on the host. The orchestrator 116 may identify a request to restart the virtualized resource. In response, the orchestrator 116 may identify a destination host in the same data center 804-1 or in a different data center 804 within the same availability zone 806 as the first data center 804-1. For instance, the destination host may be in a second data center 804-2. The orchestrator 116 may cause the virtualized resource to migrate from the original host to the destination host. In some cases, the orchestrator can confirm that the destination host can reserve sufficient capacity to host the virtualized resource, prior to causing migration of the virtualized resource.

In some cases, although not specifically illustrated in FIG. 8, at least a portion of the orchestrator 116 can be hosted by one or more of the data centers 804. For instance, the orchestrator 116 may be hosted by one of the data centers 1004 in relatively close geographical proximity to the user device 808. In some cases, the orchestrator 116 may be configured to migrate multiple virtualized resources between multiple servers in the same availability zone 806 and may be hosted by one of the data centers 1004 in the same availability zone 806 as the servers.

Figure 9:
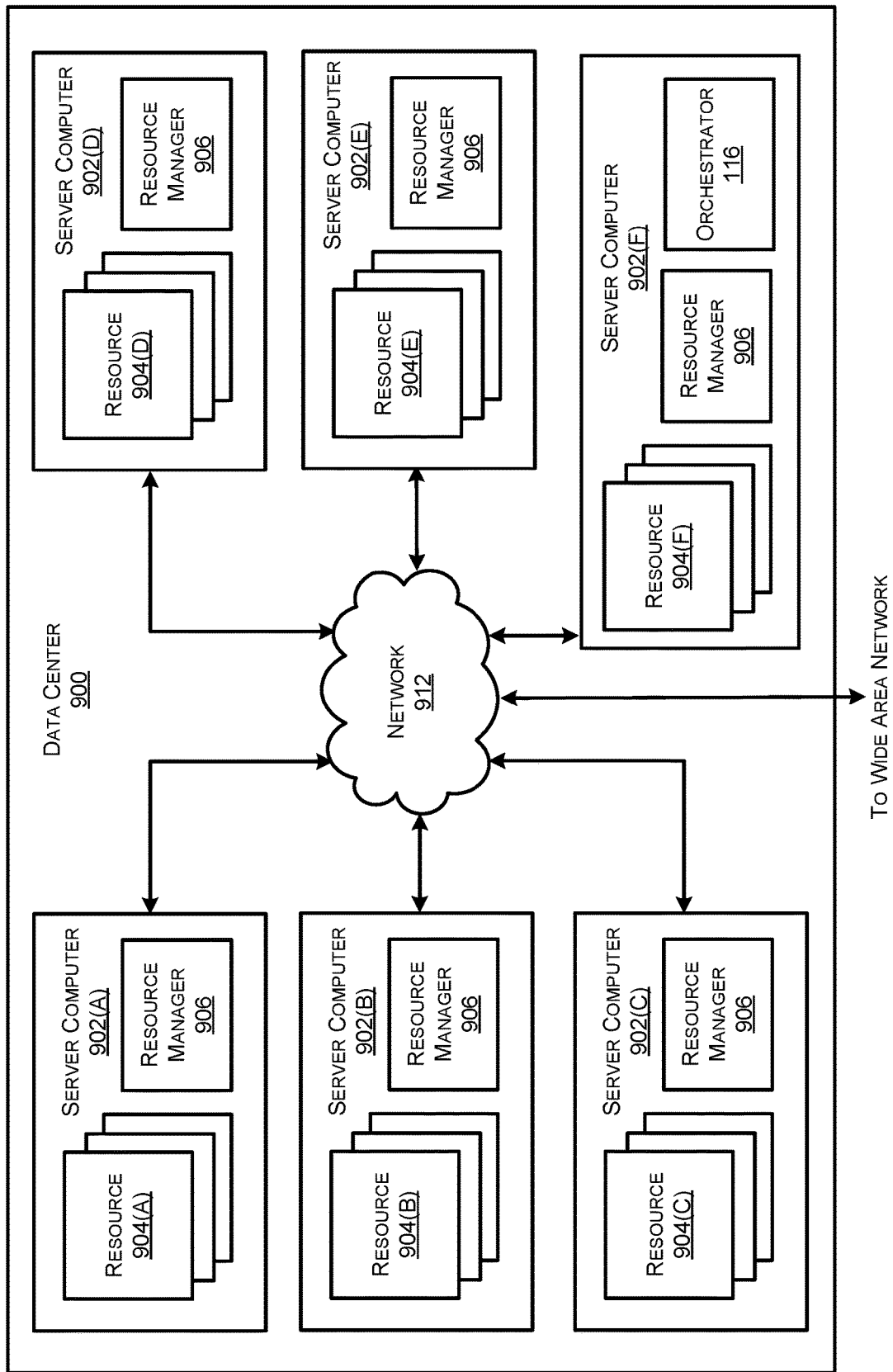
FIG. 9 is a computing system diagram illustrating a configuration for a data center that can be utilized to implement aspects of the technologies disclosed herein.

FIG. 9 is a computing system diagram illustrating a configuration for a data center 900 that can be utilized to implement aspects of the technologies disclosed herein. The example data center 900 shown in FIG. 9 includes several server computers 902(A)-902(F) (which might be referred to herein singularly as "a server computer 902" or in the plural as "the server computers 902") for providing computing resources 904(A)-904(F). In some examples, the resources 904 and/or server computers 902 may include, be included in, or correspond to, the computing resource network 802 described above with reference to FIG. 8.

The server computers 902 can be standard tower, rackmount, or blade server computers configured appropriately for providing the computing resources described herein (illustrated in FIG. 9 as the computing resources 904(A)-904(F)). As mentioned above, the computing resources provided by the service provider network 802 can be data processing resources such as Virtual Machine (VM) instances or hardware computing systems, database clusters, computing clusters, storage clusters, data storage resources, database resources, networking resources, and others. Server computers 902 in the data center 900 can also be configured to provide network services and other types of services.

The server computers 902 (i.e., server computers 902(A)-902(F)) can also be configured to execute a resource manager 906 capable of instantiating and/or managing the computing resources. In the case of VM instances, for example, the resource manager 906 can be a hypervisor or another type of program configured to enable the execution of multiple VM instances on a single server computer 902.

At least one of the servers 902 (i.e., server computer 902(F)) may further execute an orchestrator 116. The orchestrator 116 may manage restarts and/or migrations of virtualized resources between servers 902 within the data center 900.

In the example data center 900 shown in FIG. 9, an appropriate network 912 is also utilized to interconnect the server computers 902(A)-902(F). It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between each of the data centers 804-1 to 804-p (described above with reference to FIG. 8), between each of the server computers 902(A)-902(F) in the data center 900. It should be appreciated that the configuration of the data center 900 described with reference to FIG. 9 is merely illustrative and that other implementations can be utilized.

Server computer 902(F) can execute some or all of the software components described above. For example, and without limitation, the server computer 902(F) can implement the orchestrator 116. The server computer 902(F) can also be configured to execute other components and/or to store data (e.g., datastore(s) 406) for providing some or all of the functionality described herein. In this regard, it should be appreciated that the services illustrated in FIG. 9 as executing on the server computer 902(F) can execute on many other physical or virtual servers in the data centers 804 in various embodiments.

Figure 10:
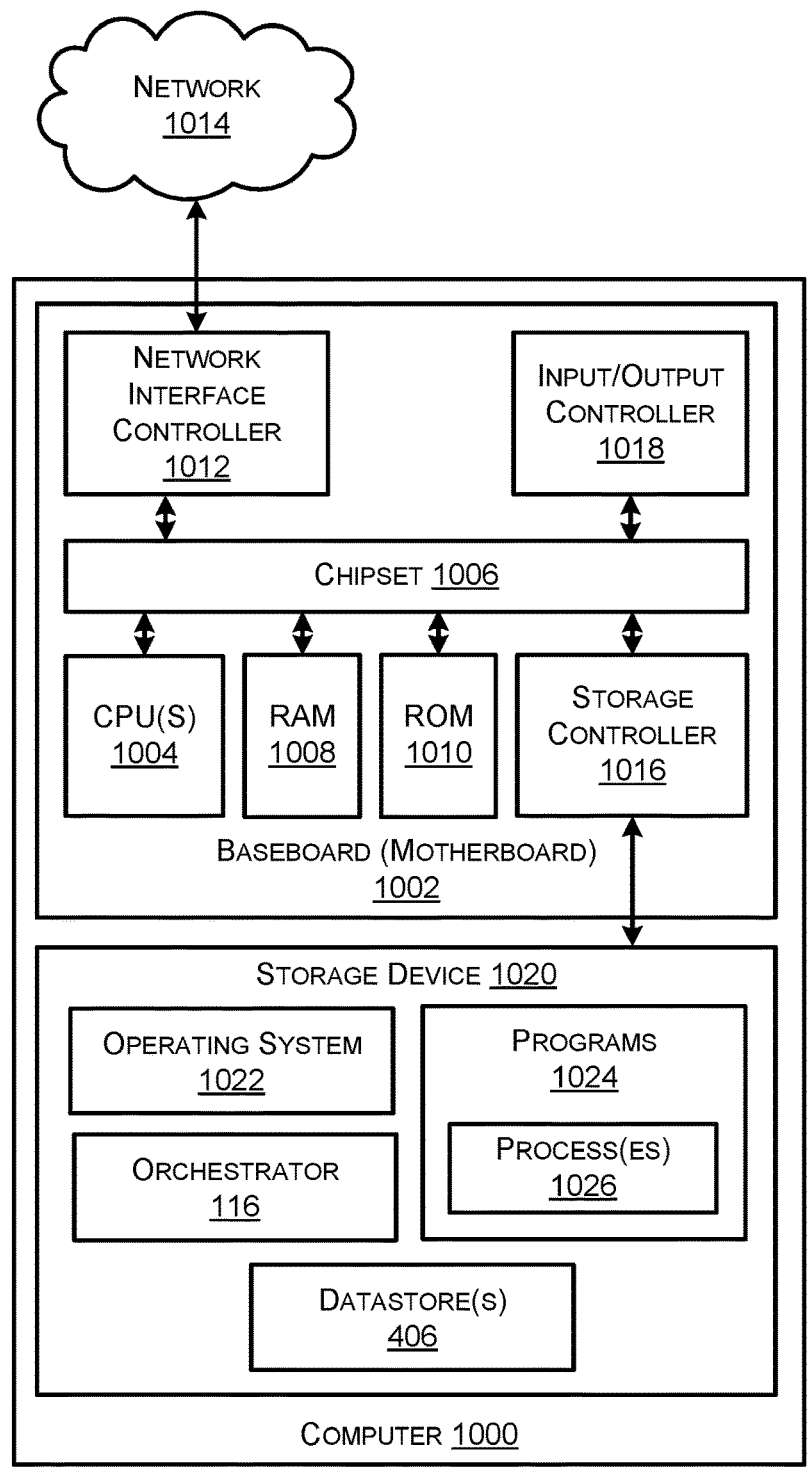
FIG. 10 is a computer architecture diagram showing an illustrative computer hardware architecture for implementing a computing device that can be utilized to implement aspects of the various technologies presented herein.

FIG. 10 is a computer architecture diagram showing an illustrative computer hardware architecture for implementing a computing device that can be utilized to implement aspects of the various technologies presented herein. The computer architecture shown in FIG. 10 illustrates a conventional server computer, workstation, desktop computer, laptop, tablet, network appliance, e-reader, smartphone, or other computing device, and can be utilized to execute any of the software components presented herein.

The computer 1000 includes a baseboard 1002, or "motherboard," which is a printed circuit board to which a multitude of components or devices can be connected by way of a system bus or other electrical communication paths. In one illustrative configuration, one or more Central Processing Units (CPUs) 1004 operate in conjunction with a chipset 1006. The CPUs 1004 can be standard programmable processors that perform arithmetic and logical operations necessary for the operation of the computer 1000.

The CPUs 1004 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1006 provides an interface between the CPUs 1004 and the remainder of the components and devices on the baseboard 1002. The chipset 1006 can provide an interface to a RAM 1008, used as the main memory in the computer 1000. The chipset 1006 can further provide an interface to a computer-readable storage medium such as a Read-Only Memory (ROM) 1010 or Non-Volatile RAM ("NVRAM") for storing basic routines that help to startup the computer 1000 and to transfer information between the various components and devices. The ROM 1010 or NVRAM can also store other software components necessary for the operation of the computer 1000 in accordance with the configurations described herein.

The computer 1000 can operate in a networked environment using logical connections to remote computing devices and computer systems through a network 1014. In various implementations, the network 1014 can include at least one of a cloud-based network, a Local Area Network (LAN), or a Wide Area Network (WAN). The chipset 1006 can include functionality for providing network connectivity through a Network Interface Controller (NIC) 1012, such as a gigabit Ethernet adapter. The NIC 1012 is capable of connecting the computer 1000 to other computing devices over the network 1014. It should be appreciated that multiple NICs 1012 can be present in the computer 1000, connecting the computer 1000 to other types of networks and remote computer systems.

The computer 1000 can also include one or more input/output controllers 1018 for receiving and processing input from a number of input devices, such as a keyboard, a mouse, a touchpad, a touch screen, an electronic stylus, or other type of input device. Similarly, an input/output controller 1016 can provide output to a display, such as a computer monitor, a flat-panel display, a digital projector, a printer, or other type of output device.

The computer 1000 can include and/or be connected to a mass storage device 1020 that provides non-volatile storage for the computer. The mass storage device 1020 can store an operating system 1022, programs 1024 (e.g., processes 1026), as well as the orchestrator 116, datastore(s) 406, and data, which have been described in greater detail herein. The mass storage device 1020 can be connected to the computer 1000 through a storage controller 1016 connected to the chipset 1006. The mass storage device 1020 can consist of one or more physical storage units. The storage controller 1016 can interface with the physical storage units through a Serial Attached SCSI (SAS) interface, a Serial Advanced Technology Attachment (SATA) interface, a Fiber Channel (FC) interface, or other type of interface for physically connecting and transferring data between computers and physical storage units.

The computer 1000 can store data on the mass storage device 1020 by transforming the physical state of the physical storage units to reflect the information being stored. The specific transformation of physical state can depend on various factors, in different embodiments of this description. Examples of such factors can include, but are not limited to, the technology used to implement the physical storage units, whether the mass storage device 1020 is characterized as primary or secondary storage, and the like.

For example, the computer 1000 can store information to the mass storage device 1020 by issuing instructions through the storage controller 1016 to alter the magnetic characteristics of a particular location within a magnetic disk drive unit, the reflective or refractive characteristics of a particular unit in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1000 can further read information from the mass storage device 1020 by detecting the physical states or characteristics of one or more particular locations within the physical storage units.

In addition to the mass storage device 1020 described above, the computer 1000 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 1000. In some examples, the operations performed by the service provider network 802 described above with reference to FIG. 8, and or any components included therein, may be supported by one or more devices similar to computer 1000. Stated otherwise, some or all of the operations performed by the service provider network 802, and or any components included therein, may be performed by one or more computer devices 1000 operating in a network-based arrangement.

By way of example, and not limitation, computer-readable storage media can include volatile and non-volatile, removable and non-removable media implemented in any method or technology. Computer-readable storage media includes, but is not limited to, RAM, ROM, Erasable Programmable ROM (EPROM), Electrically-Erasable Programmable ROM (EEPROM), flash memory or other solid-state memory technology, Compact Disc ROM (CD-ROM), Digital Versatile Disk (DVD), High Definition DVD (HD-DVD), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 1020 can store an operating system 1022 utilized to control the operation of the computer 1000. According to one embodiment, the operating system comprises the LINUX operating system. According to another embodiment, the operating system comprises the WINDOWS® SERVER operating system from MICROSOFT Corporation of Redmond, Wash. According to further embodiments, the operating system can comprise the UNIX operating system or one of its variants. It should be appreciated that other operating systems can also be utilized. The mass storage device 1020 can store other system or application programs and data utilized by the computer 1000.

In one embodiment, the mass storage device 1020 or other computer-readable storage media is encoded with computer-executable instructions which, when loaded into the computer 1000, transform the computer from a general-purpose computing system into a special-purpose computer capable of implementing the embodiments described herein. These computer-executable instructions transform the computer 1000 by specifying how the CPUs 1004 transition between states, as described above. According to one embodiment, the computer 1000 has access to computer-readable storage media storing computer-executable instructions which, when executed by the computer 1000, perform the various processes described above with regard to FIGS. 1 to 7. The computer 1000 can also include computer-readable storage media having instructions stored thereupon for performing any of the other computer-implemented operations described herein.

It will be appreciated that the computer 1000 might not include all of the components shown in FIG. 10, can include other components that are not explicitly shown in FIG. 10, or might utilize an architecture completely different than that shown in FIG. 10.

Further, in some implementations, the computer 1000 may correspond to a server configured to host one or more virtualized resources at a time. In some examples in which the computer 1000 is hosting a virtualized resource, the orchestrator 116 and/or datastore(s) 406 may be omitted from the computer 1000. In some cases in which the computer 1000 is a sever currently hosting a virtualized resource, data associated with the virtualized resource may be stored in the storage device 1020. Other architectures may be used to implement the described functionalities and are also intended to be within the scope of this disclosure. Furthermore, although specific distributions of responsibilities are defined above for purposes of discussion, the various functions and responsibilities might be distributed and divided in different ways, depending on circumstances.

The environments and individual elements described herein may of course include many other logical, programmatic, and physical components, of which those shown in the accompanying figures are merely examples that are related to the discussion herein.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
at least one processor; and
memory storing computer-executable instructions that, when executed, cause the at least one processor to perform operations comprising:
receiving, from a first server, a restart request to restart a virtual machine occupying first resources of the first server;
confirming that the virtual machine is associated with an amount of data in a local storage of the first server that is less than a threshold amount of data;
in response to the confirming, initiating a migration workflow instead of a local restart workflow;
implementing the migration workflow at least partly by:
identifying, based on the restart request, a sufficient capacity to host the virtual machine, the sufficient capacity comprising an amount of memory resources for the local storage and an amount of processing resources to accommodate the virtual machine;
identifying, among multiple second servers, a second server with the sufficient capacity as a target destination for the virtual machine;
in response to identifying the second server, migrating the virtual machine from the first server to the second server; and
receiving, from the second server, a message confirming that the virtual machine has resumed functionality on the second server; and
in response to receiving the message, transmitting, to a user device associated with the virtual machine, a restart response indicating that the virtual machine has been restarted.

2. The system of claim 1, wherein migrating the virtual machine comprises:
maintaining an Internet Protocol (IP) address of the virtual machine; and
reattaching communication interfaces associated with the virtual machine from the first server to the second server.

3. The system of claim 1, wherein identifying the sufficient capacity comprises identifying, in the restart request, a request for the sufficient capacity, the sufficient capacity being greater than a previous capacity of a portion of the first resources that the virtual machine has previously occupied.

4. The system of claim 1, wherein the response is a first response, the operations further comprising:
determining that each one of the multiple second servers lack the sufficient capacity to be the target destination for the virtual machine; and
in response to determining that each one of the multiple second servers lack the sufficient capacity, transmitting, to the user device, a restart failure response indicating that the virtual machine has been unsuccessfully restarted, and
wherein the second server is identified in response to transmitting the restart failure response.

5. A system comprising:
at least one processor; and
memory storing computer-executable instructions that, when executed, cause the at least one processor to perform operations comprising:
receiving a request to restart a virtualized resource hosted by a first server;
determining that an amount of data locally stored in the first server and associated with the virtualized resource is less than a threshold;
identifying a second server with a capacity to host the virtualized resource;
in response to receiving the request, determining that the amount of the data is less than the threshold, and identifying the second server, migrating the virtualized resource from the first server to the second server; and
transmitting a message confirming that the virtualized resource has been restarted.

6. The system of claim 5, wherein:
the capacity is a first capacity, and
the virtualized resource occupies a second capacity of at least one resource in the first server, the second capacity being less than the first capacity.

7. The system of claim 5, wherein migrating the virtualized resource comprises maintaining a configuration of the virtualized resource, the configuration comprising at least one of an Internet Protocol (IP) address of the virtualized resource, an identifier of the virtualized resource, or at least one communication interface associated with the virtualized resource.

8. The system of claim 5, wherein the message is a first message, and
wherein migrating the virtualized resource comprises:
receiving, from the first server, the data;
transmitting, to the second server, the data; and
receiving, from the second server, a second message confirming that the second server is hosting the virtualized resource.

9. The system of claim 5, wherein the request is received from a user device associated with the virtualized resource, and
wherein the message is transmitted to the user device.

10. The system of claim 5, wherein the operations further comprise:
identifying that a third server lacks the capacity to host the virtualized resource; and
in response to identifying that the third server lacks the capacity, transmitting a response indicating that the virtualized resource has been unsuccessfully restarted,
wherein identifying the second server is in response to transmitting the response.

11. The system of claim 10, wherein the request is a first request and the response is a first response,
wherein identifying that the third server lacks the capacity to host the virtualized resource comprises:
transmitting, to a network manager, a second request for identification of a target server with the capacity to host the virtualized resource; and
receiving, from the network manager, a second response indicating that the target server is unavailable, and
wherein identifying the second server comprises:
transmitting, to the network manager, a third request for the identification of the target server with the capacity to host the virtualized resource; and
receiving, from the network manager, a third response identifying the second server.

12. The system of claim 5, wherein the message is a first message,
wherein the operations further comprise:
receiving, from the second server, a second message confirming that the virtualized resource has been migrated to the second server, and
wherein transmitting the first message is in response to receiving the second message.

13. The system of claim 5, wherein the operations further comprise:
determining the threshold based at least in part on an expected time to restart the virtualized resource on the first server.

14. A method comprising
receiving a request to restart a virtualized resource occupying at least one resource of a first host;
in response to receiving the request, identifying a second host with an available capacity to host the virtualized resource, the second host being different than the first host;
determining that an amount of data locally stored in the first host and associated with the virtualized resource is less than a threshold amount of data;
in response to determining that the amount of the data is less than the threshold, migrating the virtualized resource from the first host to the second host; and
in response to migrating the virtualized resource, transmitting, to a user device associated with the virtualized resource, a message confirming that the virtualized resource has been restarted.

15. The method of claim 14, further comprising:
identifying, based at least in part on the request to restart the virtualized resource, a sufficient capacity to host the virtualized resource,
wherein:
the available capacity comprises at least the sufficient capacity to host the virtualized resource; and
the virtualized resource occupies a previous capacity of the at least one resource in the first host, the previous capacity being different than the sufficient capacity.

16. The method of claim 14, wherein migrating the virtualized resource comprises maintaining a configuration of the virtualized resource, the configuration comprising at least one of an Internet Protocol (IP) address of the virtualized resource, an identifier of the virtualized resource, or at least one communication interface associated with the virtualized resource.

17. The method of claim 14, wherein the message is a first message and migrating the virtualized resource comprises:
receiving, from the first host, the data; and
transmitting, to the second host, the data.

18. The method of claim 14, wherein migrating the virtualized resource comprises:
transmitting, to the first host, a first instruction to establish a peer-to-peer connection with the second host; and
transmitting, to the first host, a second instruction to transmit the data to the second host over the peer-to-peer connection.

19. The method of claim 14, wherein the message is a first message, the method further comprising:
receiving, from the second host, a second message confirming that the virtualized resource has been migrated to the second host,
wherein transmitting the first message confirming that the virtualized resource has been restarted is in response to receiving the second message.

20. The method of claim 14, wherein the message is a first message, the method further comprising:
identifying that a third host lacks lack the available capacity to host the virtualized resource; and
in response to identifying that the third host lacks the available capacity, transmitting a second message indicating that the virtualized resource has been unsuccessfully restarted,
wherein identifying the second host is in response to transmitting the second message.

* * * * *